United States Patent [19]

Schad

[11] 3,731,752
[45] May 8, 1973

[54] MAGNETIC DETECTION AND MAGNETOMETER SYSTEM THEREFOR

[75] Inventor: Charles A. Schad, Tulsa, Okla.

[73] Assignee: Kalium Chemicals Limited, Regina, Saskatchewan, Canada

[22] Filed: June 25, 1971

[21] Appl. No.: 156,821

Related U.S. Application Data

[62] Division of Ser. No. 791,039, Jan. 14, 1969, abandoned.

[52] U.S. Cl. .......................... 175/45, 175/61, 324/43
[51] Int. Cl. ................................................ E21b 7/04
[58] Field of Search...................... 175/40, 45, 57, 61; 324/43

[56] References Cited

UNITED STATES PATENTS

| 3,406,766 | 10/1968 | Henderson | 175/61 |
| 3,285,350 | 11/1966 | Henderson | 175/57 |
| 2,560,132 | 7/1951 | Schmitt | 324/43 |

Primary Examiner—Ernest R. Purser
Attorney—Jones and Lockwood

[57] ABSTRACT

A highly sensitive magnetometer, consisting of at least one pair of generally rectangular core elements having square hysteresis loops, for use in a guidance system for off-vertical drilling, is disclosed. The primary windings of each of the cores are driven by an oscillator, with the secondary windings of each core being differentially connected through a null circuit, which serves to balance the effects of background fields, and a detector to a suitable indicator. The primary windings of the cores are operated in resonance and the secondary windings are arranged to provide a high null output which eliminates the dead band caused by the threshold value of the diodes in the output detector circuit. This high null output may be accomplished by unbalancing the core windings or by feeding a portion of the primary winding drive current, or a signal synchronous therewith, to the corresponding secondary winding, thereby permitting measurement of the small magnetic fields which previously fell within the dead band of the device.

8 Claims, 11 Drawing Figures

Patented May 8, 1973

INVENTOR
CHARLES A. SCHAD

BY Jones and Lockwood
ATTORNEYS

Patented May 8, 1973

MAGNETIC DETECTION AND MAGNETOMETER SYSTEM THEREFOR

CROSS-REFERENCE TO RELATED APPLICATION

The present application is a division of copending application Ser. No. 791,039, filed Jan. 14, 1969, and entitled "Magnetometer Consisting of Two Mutually Perpendicular Sensors With Means For Unbalancing Each Sensor at Null Condition," now abandoned in favor of continuation-in-part application Ser. No. 164,558, filed July 25, 1971, U.S. Pat. No. 3,701,007, issued Oct. 24, 1972.

BACKGROUND OF THE INVENTION

The present invention relates, in general, to magnetometers and their associated circuitry, and more particularly to a highly sensitive system for measuring or detecting magnetic fields in mineral exploration, nondestructive magnetic testing, guidance systems for off-vertical well drilling and other related applications where a capability for measuring minute variations in magnetic fields is required.

Although magnetometers are well known in the prior art, and their utility in the measurement of various magnetic characteristics has been established, the sensitivities of such prior devices have been insufficient to permit successful application in weak field conditions. Thus, their usefulness has been limited to conditions where relatively strong magnetic fields are present, and the prior art does not teach how such devices may be made to have the sensitivities required for accurate use in the various activities mentioned above. Thus, for example, in the use of magnetometers in guidance systems for off-vertical drilling equipment, where a target magnetic field source is located in one drill hole and the drill to be guided is located in an adjacent well hole, with means to guide the drill toward the target, it has been determined that in order to obtain the required directional accuracy, a sensitivity of 0.05 gammas would be required. Since in a well-hole environment, the horizontal component of the earth's magnetic field is between 14,000 and 28,000 gammas within the United States, it is a apparent that the accurate measurement of the relatively small field that would be generated by a target magnetic field source such as a solenoid requires an extremely sensitive magnetometer, particularly where the distance between the wells is great.

Again, where airborne exploration is to be conducted by measuring the minute variations in the earth's magnetic field caused by the presence of mineral deposits underground, extreme sensitivity is required if accurate measurement and mapping is to be accomplished. The nondestructive magnetic testing of manufactured articles to locate defects in the materials used or in joints formed in the materials is becoming more and more common, and with increased usage, increased sensitivities are required for more accurate measurements.

In general, two major systems have been employed by the prior art in the measurement of magnetic characteristics by magnetometers. The first general system is the provision of circuitry for feeding back a signal which is used to null the field being sensed. When cancellation of the field is obtained, the system is balanced and a measurement of the magnitude of the feedback signal required is indicative of the strength of the field being measured. The second system, which was most commonly used in the prior art where high sensitivity was required, utilized a second-harmonic signal which was derived from the sensor windings through selective filtering. The phase and amplitude of this second-harmonic signal was detected by comparison to a standard double-frequency reference, with the output being indicative of the direction and magnitude of the sensed field and, after amplification and phase demodulation, this output could be displayed or recorded. A third, optically pumped, system may also be employed in certain instances, but is not suitable for many purposes in spite of its high absolute accuracy.

Little success was obtained in utilizing prior art magnetometers in the range of sensitivities provided by the present invention. It was found that the prior devices functioned well enough in strong fields, but in detecting fields of less than one gamma the normal background noise and the drift of the circuit compnents masked the signal being measured and resulted in an unintelligible display. These problems were particularly apparent in phase-sensitive systems, where relatively high noise to signal levels at the sensitivities employed by the present system made such prior systems unusable.

It has been usual in prior magnetometer systems to measure the strength and direction of a magnetic field through the use of two magnetic cores which are mutually perpendicular to provide 360° direction sensing by giving both X and Y coordinate vectors. The vectors are commonly resolved electronically and displayed as an azimuth on a cathode ray tube, for example. Such displays are compensated to eliminate the effects of external magnetic fields to thereby permit measurement of the selected magnetic characteristic. However, the use of electronic addition of vectors to provide a direct resultant display is not suitable for the sensitivities at which the present invention operates, and the normal noise and drift in the earth's magnetic field prevents effective nulling of the external fields. Further, since the magnetometer can assume any position relative to magnetic north, the noise components which affect the magnetic cores are almost never the same, and since they are not sufficiently small to be ignored, constant readjustment of the prior systems becomes a major, time-consuming problem.

Various other restrictive factors are involved in providing a magnetometer capable of operating at extremely sensitive levels, for at such levels environmental conditions, cable transmission characteristics, variations in cable impedence when different lengths of cable are used, variations in components, and the like can become critical, and it becomes necessary to compensate for or eliminate the effects of these various factors. Yet each compensation and each filtering step served to reduce the sensitivity, and thus the accuracy and reliability, of the prior art devices. For the foregoing reasons, and others, prior art magnetometers were found to be unsatisfactory in that they were unable to produce usable results in the measurement and detection of very weak magnetic fields.

SUMMARY OF THE INVENTION

It is therefore an object of the present invention to provide a magnetometer having improved sensitivity and which will be capable of accurately and reliably resolving magnetic fields at the level of 0.01 gammas, or $10^{-7}$ Oersteds.

It is a further object of the present invention to provide a high sensitivity magnetometer that produces easily identifiable output signals at sensitivities well beyond those available with prior devices.

Another object of the invention is the provision of a magnetometer system which may be used in conjunction with a wide variety of magnetic field measurement activities.

Thus, it is an object of the present invention to provide a method of aerial surveying through the use of a highly sensitive magnetometer which will permit more accurate aerial prospecting for mineral deposits.

It is a further object of the invention to provide a method of off-vertical well drilling which utilizes the highly sensitive magnetometer of the present invention and which thus enables more accurate drilling operations.

It is another object of the present invention to provide a magnetometer device and associated operating circuitry which will provide a highly sensitive magnetometer capable of detecting minute magnetic fields and which thus may be used in such diverse areas as the location of ore deposits, guidance systems for underground drilling operations, location of metallic objects underground or underwater, measurement of magnetic polarization for use in subsequent degaussing applications, non-destructive testing, and various other activities, in each case the sensitivity of the present device producing a greater capability and greater degree of accuracy in various applications than is possible with prior art devices.

An additional object of the invention is the provision of a method of operating a magnetometer which will provide improved accuracy and sensitivity over the prior art.

The foregoing objectives are accomplished through the use of an improved magnetic structure for the magnetometer device as well as through the use of improved circuitry in conjunction with such structure. Two magnetic core elements, each having a closed, generally rectangular configuration, are, in a preferred embodiment, to be mutually perpendicular and in parallel planes, one core being located above the other. An energizing winding and a secondary, or pickup winding, is provided for each core, with each winding consisting of two coils, one wound on each leg of the core. The primary winding induces in the secondary winding signals which are coincident and 180° out of phase, under balanced conditions, so that no output results. Imposition of an external field alternately advances and retards the time phase of saturation of the two legs of the core so that a differential output signal results at the secondary winding. The output signal from each secondary winding is proportional to the vector component of the imposed field which is parallel to the axis of the corresponding core. Such and external field will affect both of the perpendicularly mounted cores, thereby providing vector signals which may be resolved to provide an indication of the direction and magnitude of the external field in the planes of the cores.

Where the two cores are perpendicular, resolution of the vector components is accomplished in conventional manner using rectangular coordinates, as by plotting the component amplitudes and solving graphically for the actual field direction in the plane of the cores. In this configuration the magnetometer has a uniform sensitivity, and for this reason it is generally preferred.

If desired, the magnetometer cores may be arranged with the core axes at other than a right angle, in which case the directional sensitivity becomes nonuniform; as the two axes approach parallelism, the directional sensitivity approaches that of a single core. When the cores are not mutually perpendicular, the resolution of the output signals to obtain the actual direction and amplitude of the magnetic field becomes more complex, but it can be accomplished by known mathematical procedures or by a graphical resolution using a nonrectangular system of coordinates. In the latter case, the measured components of a magnetic field H from each of two cores A and B are plotted on the nonrectangular coordinates, the A core measuring a component $H \cos\alpha_A$, and the B core measuring a component $H \cos\alpha_B$, where $\alpha_A$ is the angle between the field H and the axis of core A, and the $\alpha_B$ is the angle between the field H and the axis of core B. It will then be seen that the intersection of $H \sin \alpha_A$ and $H \sin \alpha_B$ will determine the location of the plotted line representing the direction and amplitude of the field H.

A nonperpendicular arrangement of cores has limited use, however, because as the angle between the cores decreases the signals to be resolved can become smaller. For example, where the cores are perpendicular, at least one of the signals will always be equal to or greater than 0.707H, and the smallest that both can be at the same time is also 0.707H. On the other hand, if the cores are arranged at a 45° angle, the same minimum signal value becomes 0.382H. Thus, where small fields having unknown directions are to be measured, it is generally desirable to arrange the cores to be mutually perpendicular so that the maximum signal is obtained.

The use of two cores permits measurement of that component of the external magnetic field of interest which lies in the plane of the cores. By taking measurements of this external field with the cores in horizontal and vertical orientations, the absolute direction and magnitude of the field can be determined. Again, if the cores are mutually perpendicular and the two orientations are perpendicular, the resolution of the measured field components can be carried out in the conventional manner, whereas nonperpendicular measurements require more complex mathematical or graphical manipulation. Although the present invention is described in terms of two cores, it will be apparent that a third sensor with its associated circuitry may be used in combination with the two described cores to permit measurement of three magnetic field components. This arrangement would allow calculation of the absolute direction and amplitude without the need for reorientation of the cores. Again, it would be conventional to arrange the three cores to be mutually perpendicular, although nonperpendicular arrangements could be used.

The magnetic cores preferably are of a material exhibiting a generally square or rectangular hysteresis loop, and thus are normally driven into saturation during the operation of the device. The primary windings are driven by a suitable oscillator to provide the required alternating current and a null balancing means is connected to the secondary windings to balance the effect of any magnetic fields which are not of interest in the measurement being made. A portion of the exitation current driving each primary winding is fed to the secondary winding in order to insure that the null output from the secondary windings has an amplitude sufficient to overcome the conduction threshold of the detector means which is connected to each secondary winding. To further increase the level of the null output capacitors are connected across the primary windings to provide a resonant condition in the primary windings. The detector means connected to each of the secondary windings includes a diode which serves to convert the output signals to a corresponding direct current, and it is to these diodes that the portion of the excitation current is applied to insure conduction even at a null condition and thus to eliminate the loss of signal normally caused by the threshold of conduction of such devices. To improve the accuracy and reliability of the magnetometer measuremnts, the output of each secondary winding is monitored separately. The outputs being alternately switched into common amplifiers and recorders to eliminate the errors that are inherent in systems which utilize a separate amplifier for each channel. Such errors arise from inherent differences in the characteristics of amplifiers, such as nonlinearity, drift due to temperature changes, and the like.

In addition to the foregoing, or as an alternative, conduction of the detector diodes can be insured at null conditions by intentionally unbalancing the primary windings by a slight amount so that one side of a secondary always receives a larger pulse than the other side. The net effect is to provide an output equal to the difference between the two sides which is sufficient to produce a null output that will overcome the diode threshold so that any superimposed outputs caused by the measured field will be passed by the diodes. A similar effect can be obtained by selective positioning of the secondary winding on the core, without altering the coil symmetry. It appears that such positioning of the core causes a differential output under external field null conditions because of discontinuities in the core caused, for example, by changes in the permeability or in the amount of core material at points where the tape wound core starts and finishes. However, because of the difficulty in obtaining an optimum location for the secondary, this latter method is not very practical.

The null balancing means consists of a selectively variable source of direct current which may be connected to the secondary windings in order to compensate for the effects of undesired extrnal magnetic fields. In order to prevent this null balancing current from affecting the detector circuits, coupling capacitors are connnected between the secondary windings and the detectors. The null balancing current then is fed directly to the secondary windings to compensate for the earth's magnetic field or other background fields.

The magnetometer described above, and operated in conjunction with the above-described circuitry, exhibits a sensitivity which enables it to be used in a large number of applications with an accuracy and reliability not previously available. One such application is illustrated in detail in the present application, wherein, there is provided a guidance system for off-vertical well drilling. In this system, the magnetometer described hereinabove is located in a target well, and a magnetic field generator, such as a solenoid or electromagnet, is located in a second well some distance from the first. The electromagnet is carried by a drill string which is to be guided in accordance with the measurements of the field generated at the target well, as obtained by the magnetometer. These measuremnts provide an indication of the direction of the generated field, and slight changes in the measured components will provide an immediate warning of changes in the direction of travel of the drill with respect to the targe magnetometer, whereby errors can be corrected and accurate control exercised. The sensitivity of the magnetometer of the present invention provides an improved detection capability, and this results in considerable savings in time and expense in the drilling of off-vertical holes.

The guidance system includes, in addition to the magnetometer described above, an alternating current supply for the drill string magnet which provides a unique and easily identifiable magnetic field. The AC supply includes a pair of cam driven potentiometers which provide a transient free, square wave AC waveform. Also included in the guidance system is a control motor for directional guidance of the drill, attitude sensors which permit remote monitoring of drill position, and various switching networks which permit calibration of the monitoring system, activation of the sensors, and operation of the control magnet and directional motor, all in a predetermined sequence. A switch position indicator mechanism is also provided to permit monitoring of the switching networks.

The described guidance system, utilizing the increased sensitivity of the target magnetometer of the present invention and the improved control and sensing mechanism of the drill string circuits, permits more accurate results than were available with prior magnetic guidance systems, and thus permits off-vertical holes to be drilled more quickly, and with less expense than before. In addition, target and drill holes can be spaced further apart than was possible with prior devices.

BRIEF DESCRIPTION OF THE DRAWINGS

Although the present invention is described in terms of preferred embodiments, it will be understood by those skilled in the art that various modifications of the specific circuitry are embraced within the scope of the invention as defined by the claims. The foregoing and additional objects, features and advantages of the present device will best be understood and appreciated from the following detailed description of a preferred embodiment of the invention and of a specific application thereof which have been selected for purposes of illustration and are shown in the accompanying drawings, in which:

DESCRIPTION OF THE PREFERRED EMBODIMENTS

Figure 1:
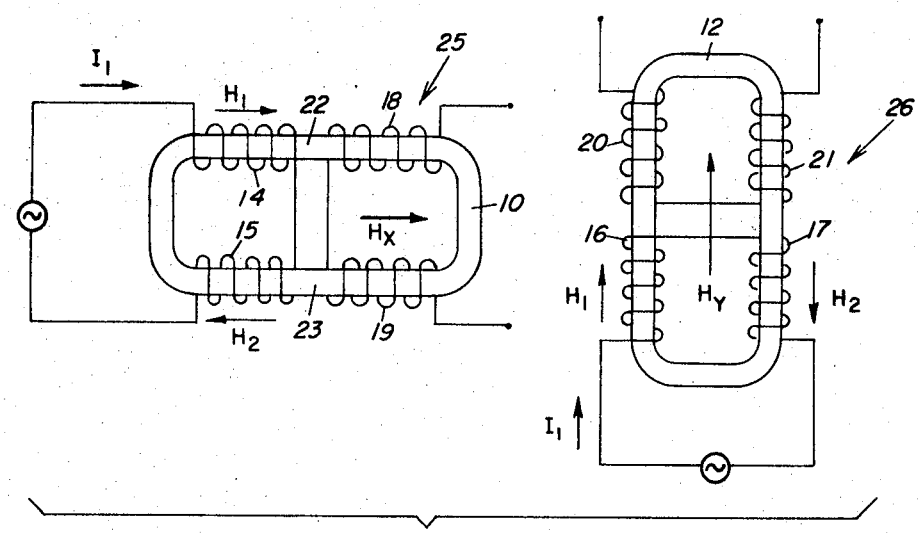
FIG. 1 is a diagrammatic illustration of magnetic core elements suitable for use in the magnetometer of the present invention.

Turning now to FIG. 1 of the drawings, there is illustrated a pair of magnetic cores 10 and 12 arranged at an angle to each other and lying in the same or in parallel planes. In use, the cores preferably will be located one above the other, instead of side by side, but the arrangement of FIG. 1 provides a better view of the manner in which the windings are arranged. As has been explained, the angle between the axes of the cores preferably is 90°, so that each core will respond to the components of the magnetic field of interest which correspond to the X and Y axes of a conventional rectangular coordinate system, as illustrated in FIG. 1. If a non-uniform pattern of sensitivity is desired, the cores can be arranged in various configurations, with the appropriate mathematical analysis being used to relate the core orientations and measured field component values in order to obtain the desired information concerning the field of interest. For purposes of this disclosure, it will be assumed that the axes of the cores 10 and 12 are mutually perpendicular, and represent the components of an external field measured along the X and Y or Y and Z axes of a conventional rectangular coordinate system.

Figure 2:
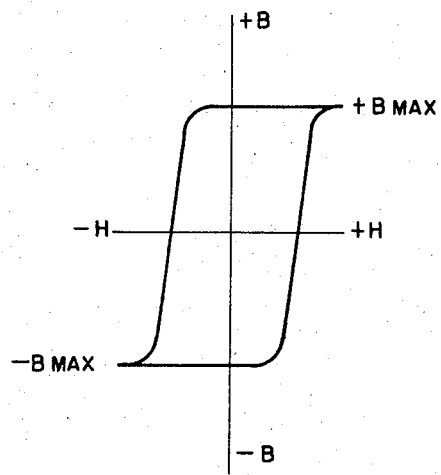
FIG. 2 illustrates the square hysteresis loop characteristic of the magnetic core of FIG. 1.

The cores are fabricated in conventional manner from a magnetic material having a very nearly rectangular hysteresis curve, such as that illustrated in FIG. 2, where the field (B) induced within the core is plotted against the external magnetizing field (H).

Core 10 carries a primary winding made up of coils 14 and 15 wound in the same direction on opposite legs of core 10, whereby the magnetic flux generated by a current $I_1$ flowing in the primary winding is additive around the core. Similarly, core 12 carries a primary winding comprised of coils 16 and 17 connected in series on opposite legs, producing a magnetic flux which is additive. A secondary winding is carried by core 10, and includes coils 18 and 19 which are oppositely wound on the two legs of the core, whereby magnetic flux in the core tends to induce oppositely flowing currents in each secondary coil. The signals induced in coils 18 and 19, under ideal conditions with an equal number of turns in each coil, are coincident and 180° out of phase, so that no output results. In similar manner, core 12 carries coils 20 and 21 making up a differential secondary winding which under ideal conditions, produces no output. An alternative arrangement for the secondary windings utilizes a single coil in place of coils 18, 19 and a single coil in place of coils 20, 21, the single winding in each case enclosing both legs of its respective core, so that the differential effect is retained. However, for convenience, reference will herein be made to the two-coil embodiment.

As the magnetic field due to current $I_1$ in the primary of each core increases in a positive or negative direction, the magnetic flux in the cores increases in a corresponding manner until a point is reached where no further change can occur in the flux with a further change in the current, and the core is saturated. When a core material having the square loop characteristic of FIG. 2 is used, the saturation point is reached very suddenly, as shown at plus or minus $B_{max}$, and upon reversal of the current the saturation curve changes and follows a different path. Thus, when an alternating current is applied to the primary windings which has sufficient magnitude to drive the core to saturation in both directions, the induced flux will follow the curve of FIG. 2, and under balanced conditions no output will result.

If a balanced core arrangement is exposed to an external magnetic field having a component $H_x$ parallel to the axis of core 10 and a component $H_y$ parallel to the axis of core 12, the time phase of saturation in the two axial legs of cores 10 and 12 will be changed. Thus, if the field component $H_x$ is in the direction illustrated in FIG. 1, it will aid the field $H_1$ produced by primary winding coil 14 and oppose the field $H_2$ produced by the primary winding coil 15. This will result in an advance in the time phase of saturation of the upper leg 22 of core 10, while retarding the saturation time of lower leg 23. The currents induced in secondary coils 18 and 19 will no longer be equal and opposite and an output signal proportional to the unbalance and thus to the magnitude and direction of the field component $H_x$ will be produced by the secondary windings. In similar manner, the secondary coils 20 and 21 will produce an output signal porportional in amplitude and polarity to the magnitude and direction of field component $H_y$. The two output signals thus represent the X and Y coordinate vectors from which may be resolved a resultant vector indicative of the applied magnetic field. The magnetic cores and their windings may thus be referred to as flux valves flux gates, or magnetic sensor elements, 25 and 26, respectively.

Magnetometers operating in accordance with the foregoing principles are well known in the art. The vectors obtained in the manner described above from the secondary windings of flux valves generally are combined and displayed as an azimuth on a cathode ray tube, as a spot on such a tube, or simply as a meter reading which may be plotted. However, the considerations mentioned hereinabove have prevented such systems from operating in changing conditions with the required degree of sensitivity or reliability, and for these reasons the magnetometer circuitry of FIG. 3 has been devised.

Figure 3:
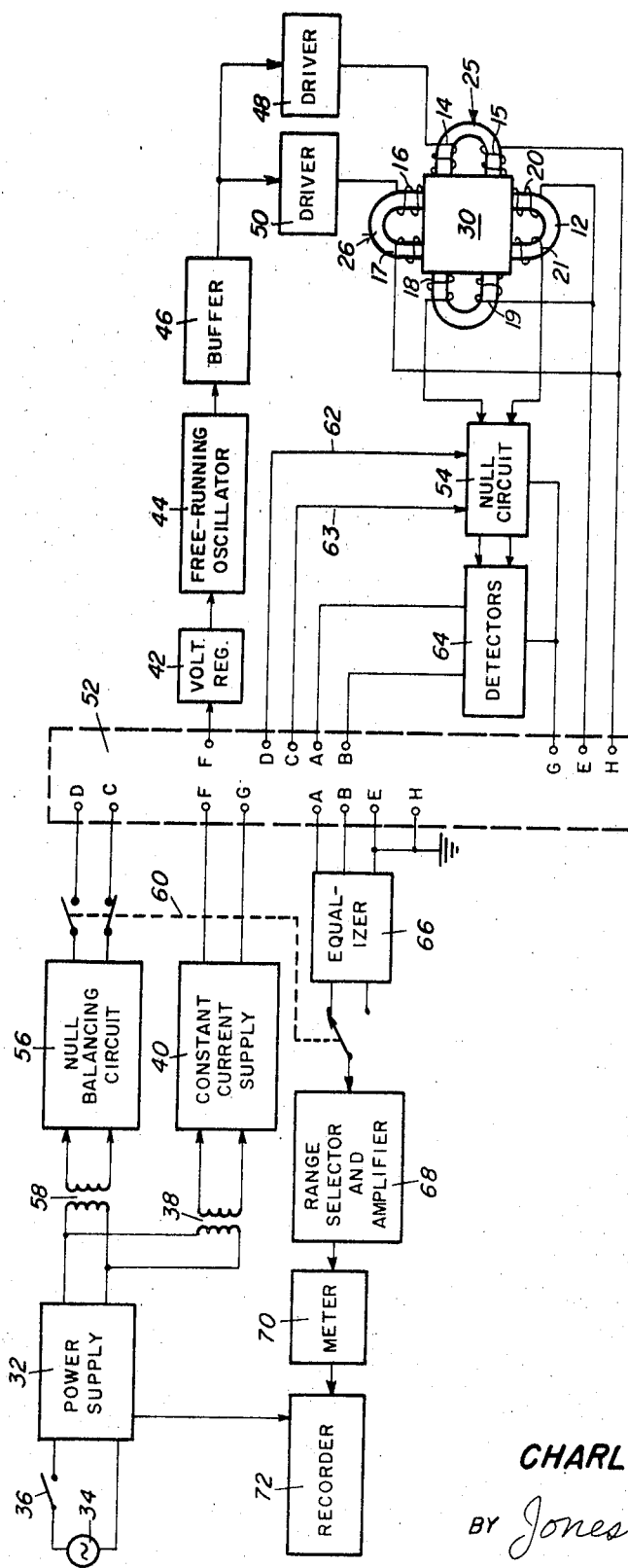
FIG. 3 is a block diagram of the electric circuitry used in conjunction with the magnetic core of FIG. 1 to produce the highly sensitive magnetometer of the present invention.

Referring now to FIG. 3, the flux valves 25 and 26 are indicated in their normal relationship and are diagrammatically shown as supported by a suitable housing 30. The type of housing in which the saturable core elements and their associated windings are mounted will depend upon the particular use to which the magnetometer is put. However, a suitable housing would include Formica side and top walls adapted to receive and cover the flux valves, with the coils and other wiring being potted or otherwise suitably sealed in a material such as silicon rubber. The sensors 25 and 26 will normally be mounted in parallel, spaced horizontal planes, with the axes of the cores being mutually perpendicular, and in this position will measure horizontal components of magnetic fields. By rotating the sensors to lie in vertical planes, the vertical components of the same fields can be measured to provide a measurement of the absolute direction and magnitude of the field.

The primary windings of the magnetic cores 10 and 12 of the sensors are driven by a power circuit which includes a power supply 32 energized from a suitable source of alternating current 34 through a power switch 36. The output of the power supply is fed by way of transformer 38 to a constant current supply 40. The output of supply 40 is fed by way of terminals F to a voltage regulator 42 to energize a free running oscillator 44. The oscillator produces an alternating output of predetermined frequency and magnitude which is fed through a buffer amplifier 46 and a pair of driver amplifiers 48 and 50 to feed the primary windings of cores 10 and 12, respectively. Terminals F are represented as being a part of a connector 52 which may provide a direct connection between the two terminals or which may be a suitable cable for remote location of the sensors with respect to the power supply. By connecting the power supply on one side of the connector 52 and the voltage regulator and osillator on the other side of the connector, the system can accommodate long lengths of cable between the respective terminals without adversely affecting the sensitivity and accuracy of the magnetometer. The particular nature of the connector 52 will depend, then, upon the particular application of the magnetometer system, as will be seen more clearly from the detailed descriptions hereinbelow.

The output signals from the secondary windings of cores 10 and 12 are applied separately to corresponding channels in a null circuit 54. The null circuit is energized by means of a null balancing circuit 56 which receives its power from power supply 32 by way of transformer 58. Any output from the null balancing circuit 56 is connected through a selector switch 60, either terminal D or terminal C in connector 52, and through line 62 or 63 to the null circuit. Selector switch 60 allows the output from the secondary winding of either core 10 or core 12 to be detected in corresponding channels of detector 64 and fed through corresponding terminals A or B in connector 52 to equilizer 66. The appropriate output from equalizer 66 is selected by selector switch 60, whereby the sensor output being detected is fed to an amplifier and range selector 68. The amplified signal may then be displayed on a meter 70 and recorded on a suitable recording means 72. The recorder is energized from the power supply 32.

By monitoring the outputs of each sensor separately, the accuracy and reliability of the measurements are improved. These outputs may be recorded separately, and individual calibration curves may be used for each signal to provide compensation for any differences between the sensors. By feeding the signals from both secondary windings alternately through the same amplifier, variations in the amplifier will not appreciably affect the readings, since the relative magnitudes of the two signals are more important than their absolute magnitudes. If two amplifiers were used, differences in their drift characteristics (i.e., due to temperature changes) would produce a differential gain which would introduce error. With a single amplifier however, such, drift will not alter the accuracy of the result as long as this drift does not occur during the short interval between measurement of the two sensor outputs, and, long term drift will not affect direction sensing even if it alters the magnitude of the readings.

An advantage of reading the output from each secondary winding individually is that the actual wave form of the signals may be recorded. Then, even though the recording may drift or wander with background noise, it is possible to detect with considerable accuracy a very small signal superimposed on the noise, if the waveform of the signal is known. Such a known signal waveform may be caused, for example, by a generated magnetic field which varies in accordance with a predetermined pattern, which pattern can be discerned on the recorded signal. If the two outputs are electronically added before the recording, it becomes much more difficult to distinguish the signal field from the background noise. Recording the actual waveform offers the further advantages that malfunctions in the system are simpler to spot, for changes in the received known waveform will be indicative of the presence of and nature of such a malfunction. Further, fewer components are required for the system, thus increasing reliability.

In operation, then, the magnetometer system of FIG. 3 utilizes a free running oscillator at the location of sensors 25 and 26 to provide the excitation current to the primary windings of each sensor. The null balancing circuit 56 feeds a current by way of null circuit 54 to the secondary of each sensor to balance out known external fields, such as the earth's magnetic field, in the region of the sensors; thus, the output from each sensor will normally be zero. After the null condition has been obtained, a variation in the external field, such as may be caused by a mineral deposit or by a superimposed target field, will produce a corresponding change in sensor output from the null balance condition, resulting in a detectable signal from one or both sensors. The differential output signal from each sensor is applied through a corresponding channel in the equalizer to the amplifier 68 for display on a meter or recorder, or both. The coordinate vectors of the field variation thus are detected by the two perpendicular sensors, and the resulting two outputs at the meter 70 and recorder 72 may be analyzed to obtain the magnitude and direction of the field variation being sensed.

Figure 4:
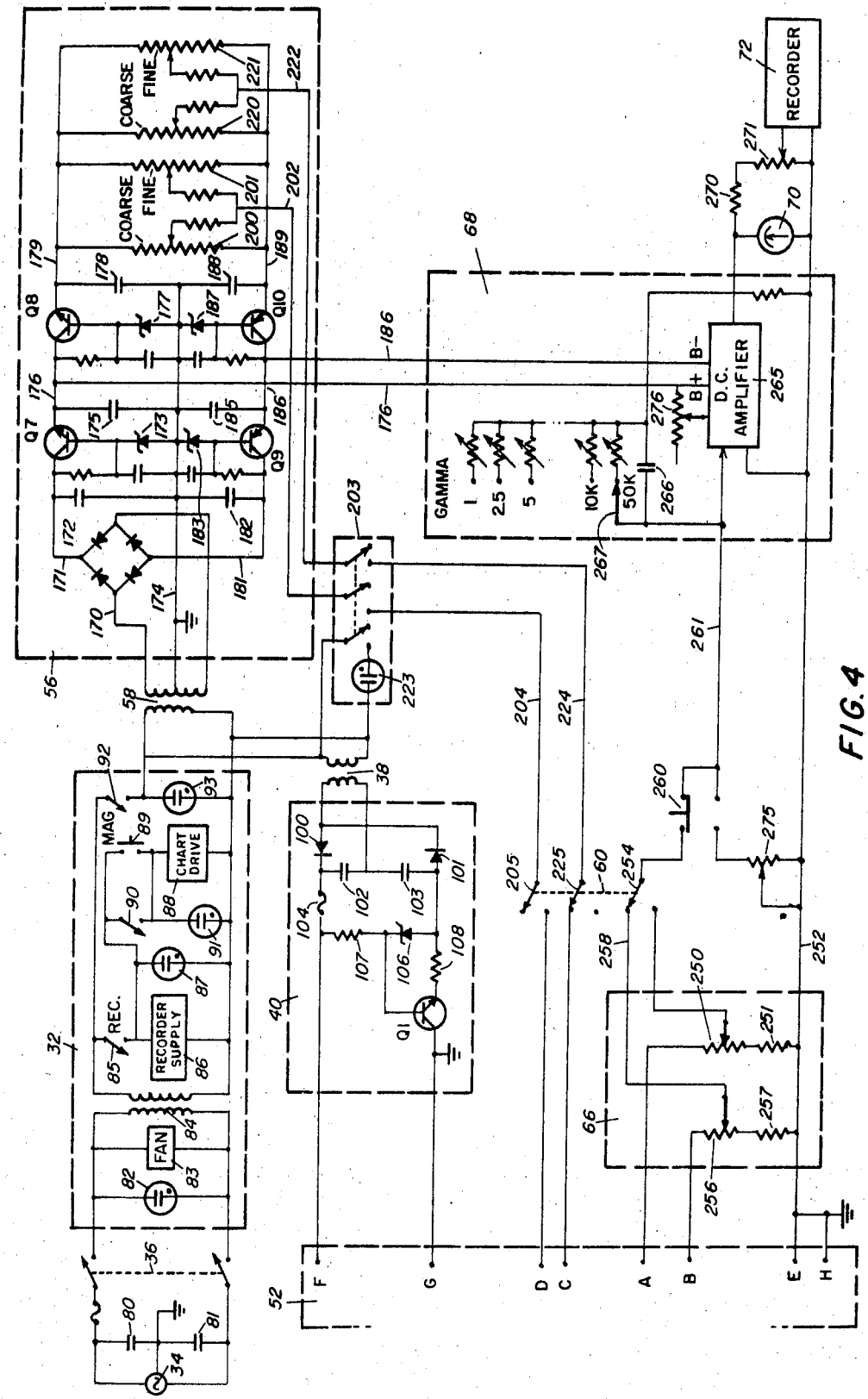
FIG. 4 is a schematic diagram of the base portion of the circuitry of the system of FIG. 3.
Figure 5:
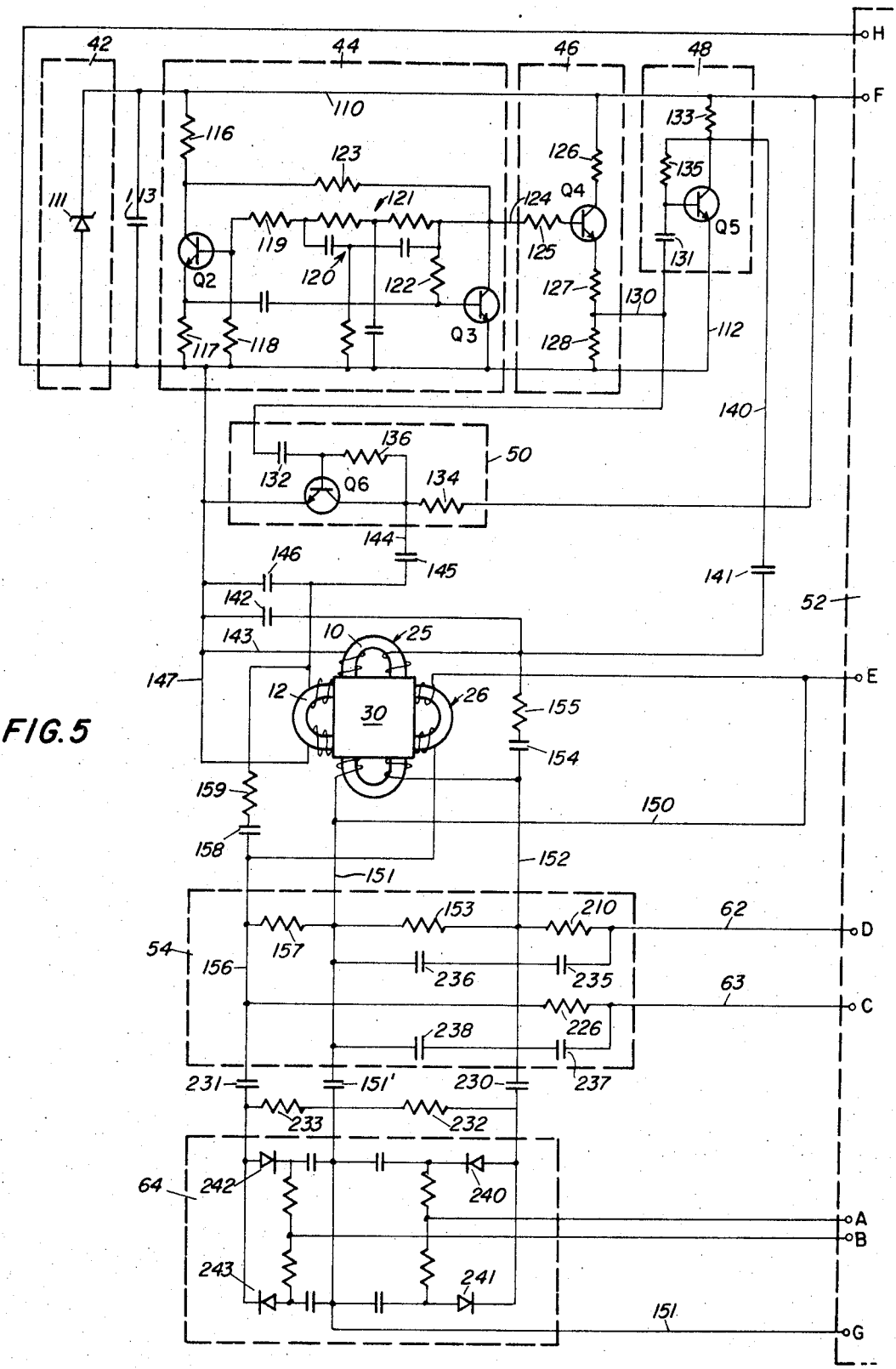
FIG. 5 is a schematic diagram of the remote portion of the circuitry of the system of FIG. 3.

Turning now to a more detailed consideration of the magnetometer system of FIG. 3, there is illustrated in FIG. 4 a schematic diagram of the circuitry on the power supply side, or base portion, of connector 52. FIG. 5 is a schematic diagram of the circuitry for the sensor side, or remotely locatable portion, of the connector 52 in FIG. 3. The various blocks in the block diagram of FIG. 3 are illustrated in FIGS. 4 and 5 by dotted lines similarly numbered.

Turning now to FIG. 4, the power supply 32 receives its input from alternating current source 34 by way of power switch 36. The alternating current source may be filtered by means of capacitors 80 and 81 connected between the two sides of the 117 volt input and ground. A neon indicator lamp 82 is located within the power supply 32 and lights when the power supply is turned on. A fan 83 may be provided, if required, to maintain a flow of cooling air across the electronic circuitry used in the present system. The input power is converted to the desired voltage level by means of a constant voltage transformer 84 connected across the AC source. The supply for recorder 72 is connected across the secondary of transformer 84 by way of recorder switch 85, as indicated at 86. A neon indicator lamp 87 is connected across the recorder supply 86 to indicate when the recorder is energized. A chart drive motor 88 may be provided for the recorder and may be selectively energized by either push button switch 89 or toggle switch 90, both of which are in series with recorder switch 85 and connect the chart drive motor across the secondary of transformer 84. Neon lamp 91 shunts the chart drive motor to indicate when it is energized.

Also connected across the secondary of transformer 84 are the two power supply output transformers 38 and 58. These output transformers are connected in parallel with each other and in series with a magnetometer switch 92 for controlling energization of the magnetometer circuitry. A neon lamp 93 indicates whether the output transformers are energized.

Output transformer 38 feeds the constant current supply 40 which is a current-regulated rectifier circuit. The upper end of the secondary of transformer 38 is connected to opposed diodes 100 and 101 in the common full wave rectifier arrangement. The outputs of the diodes are connected through capacitors 102 and 103, respectively, to the lower end of the secondary winding on transformer 38 to provide a filtered DC signal across lines 104 and 105. The series arrangement of a Zener diode 106 and resistor 107 is connected across lines 104 and 105, with the junction between these elements connected to the base of a transistor Q1 in line 105, the Zener diode providing a constant voltage at the base of Q1 to regulate the current flow therethrough. The emitter of Q1 is connected through resistor 108 to the other side of Zener diode 106, while the collector is grounded. Output terminal G is connected to the grounded collector of Q1 while output terminal F is connected to line 104 and carries the regulated DC current to connector 52.

Terminal F in FIG. 5 carries this regulated direct current to line 110 in the remotely locatable portion of the magnetometer, which line thus carries the B+ supply for the oscillator 44, buffer amplifier 46 and driver amplifiers 48 and 50. The voltage on line 110 is regulated at the remote location by voltage regulator 42 which comprises a Zener diode 111 connected between line 110 and the ground line 112 connected to terminal H. A capacitor 113 is connected across diode 111 to provide a filter for any AC components that might appear in line 110 by reason of the conditions encountered in connector 52. By including the regulator 111 at the remote portion of the magnetometer, the rated voltage on line 110 is assured, regardless of the nature of the connection represented by connector 52.

Oscillator 44 is a conventional free running oscillator utilizing transistors Q2 and Q3 connected in a known manner. The feedback paths for the transistors are parallel T networks, or notched filters, and these feedback networks determine the frequency of the oscillator output. Resistors 116 and 117 connect the collector-emitter circuit of transistor Q2 between lines 110 and 112. The base of Q2 is connected through resistor 118 to line 112 and through resistor 119, the parallel T networks 120 and 121, and resistor 122 to the base of Q3. The junction of the parallel T networks and resistor 122 is connected to the collector of Q3, through resistors 123 and 116 to line 110, and to the oscillator output line 124. The emitter of Q3 is connected directly to ground line 112. The oscillator is designed to run at about 2,000 Hz, the output signal being applied through line 124 to the buffer amplifier 46 which comprises a transistor Q4 connected in an emitter-follower configuration. The signal on line 124 is applied through resistor 125 to the base of Q4, the collector being connected through resistor 126 to the supply line 110 and the emitter being connected through resistors 127 and 128 to ground line 112. The junction of resistors 127 and 128 provides the buffer amplifier output, which appears on line 130.

The 2,000 Hz signal on line 130 is applied to the base electrodes of driver amplifier transistors Q5 and Q6 by way of blocking capacitors 131 and 132, respectively, in corresponding drivers 48 and 50. The emitter electrodes of Q5 and Q6 are connected to ground line 112 while the respective collectors are connected through resistors 133 and 134 to supply line 110. Bias resistor 135 is connected between the base and collector of Q5 while bias resistor 136 connects the collector of Q6 to its base electrode. The output signal from driver 48 is derived from the collector electrode of Q5 and is applied by way of line 140, series blocking capacitor 141 and shunt capacitor 142 to one end of the primary winding of sensor 25. The other end of this primary winding is connected by way of line 143 to ground. Similarly, the output from driver amplifier 50 is derived from the collector of transistor Q6 and applied by way of line 144 through series capacitor 145 and shunt capacitor 146 to one side of the primary winding of sensor 26; the other side of this primary winding is connected by way of line 147 to ground line 112. Coupling capacitors 141 and 145 are used to connect the outputs of the driver amplifiers to the sensors in order to eliminate the need for iron core transformers in the vicinity of the saturable cores 10 and 12. Capacitors 141 and 145 not only block unwanted direct current, but are used as impedance matching elements.

Capacitors 142 and 146 are shunted across the primary windings of sensors 25 and 26, respectively, and are of such a value that the cores 10 and 12 are driven in a ferroresonant condition. By operating these devices in resonance, very high magnetizing currents are generated for very short intervals of time, without excessive heating of the core windings. Generally, the current flow in the primary windings of the sensors is limited by the relatively high inductance of the magnetic core material; however, upon saturation of the core, the current is limited only by the winding resistance, the circuit resistance and the air inductance of the winding. As a result, relatively high currents can flow in the primary winding while the core is saturated. The shunt capacitor receives and stores energy from the driver amplifier until the core saturates, at which time the charge carried by the capacitor flows through the low impedance of the winding and is superimposed on the current from the driver. The capacitor discharges in a very short time, abruptly transferring the energy of the capacitor to electromagnetic energy in the field surrounding the primary winding. When the capacitor has discharged, this field collapses to charge the capacitor in the opposite direction and saturation in the reverse direction begins. The oscillator serves to replace the energy lost in the various impedances and to provide the initial saturation of the core in each direction of the alternating input signal. Proper selection of the capacitor causes a reeonant flow in this LC circuit.

Since the amplitude of the signal induced in the secondary winding of each core is proportional to the time rate of change of the flux generated by its corresponding primary winding, very little voltage is induced into the secondary winding while the core is saturating. However, upon saturation of the core, a substantial pulse is induced in the secondary during the high amplitude, short time pulse caused by the discharge of the shunt capacitor. In one embodiment of the sensors, built in accordance with the present invention, a peak primary current pulse in excess of two amperes was measured, this pulse having a duration of approximately eight microseconds. This represented a peak magnetizing force of about 40 Oersteds, or about 400 times the field required to saturate the core. Thus, very high output pulses may be induced in the secondary windings of the cores, even though the saturated cores cause the operation to be equivalent to that available in air core transformers.

One side of the output, or secondary, winding of sensor 25 is connected by way of line 150 to terminal E in connector 52. Reference to FIG. 4 will show that terminal E is grounded in common with terminal H. This same side of the secondary winding for sensor 25 is also connected, by way of line 151 and through DC blocking capacitor 151, to terminal G in connector 52, which terminal is also grounded. The other side of the secondary winding for core 10 is connected by way of line 152 to a load resistor 153 connected between lines 151 and 152. A loop comprising capacitor 154 and resistor 155 is connected in series between line 152 and the input to the primary winding of sensor 25. This loop permits a direct coupling of a portion of the primary drive signal into the secondary winding to increase the level of the secondary null condition output, for reasons to be explained hereinbelow.

One side of the secondary winding on sensor 26 is connected to terminal E and, by way of lines 150 and 151 to terminal G. The other side of this secondary winding is connected by way of line 156 through load resistor 157 to line 151. Line 156 is also connected by way of capacitor 158 and resistor 159 to the input of the primary winding on sensor 12, forming a loop whereby a portion of the primary drive signal may be fed to the secondary winding.

As has been noted above, under ideal conditions where no external field is present, a zero output will be obtained from the secondary windings of each sensor 25, 26, because they are differentially wound; under such ideal conditions there will be no voltage across load resistors 153 and 157. However, as a practical matter it will not be possible to obtain the ideal condition and there will usually be some differential output due to differences in the various windings, imperfections in the core material and, most particularly, by reason of external fields. Means are provided, therefore, to compensate for undesired outputs, and this is the function of null circuit 54 and null balancing circuit 56. Of course, if a specific external field is to be measured, the null circuit will not be used to compensate for it, but only to compensate for undesired fields. Where variations from the normal value are to be detected, or where specific field variations superimposed on the earth's magnetic field and other background fields are to be detected, then the normal output due to the earth's magnetic field and other undesired fields must be eliminated. This is accomplished by means of the null balancing circuit 56 indicated in FIG. 3 and shown in schematic form in FIG. 4.

Referring now to FIG. 4, null balancing circuit 56 is powered by means of transformer 58, the secondary winding of which is grounded at its center tap, with the outer ends feeding a full wave rectifier 170. The positive side of the rectifier is fed through line 171 across a filter capacitor 172 to a first voltage regulator which consists of a transistor Q7 having its base connected through Zener diode 173 to ground line 174. The emitter output of Q7 is connected across shunt capacitor 175 by way of line 176 to the input of a second series voltage regulator Q8. The base electrode of Q8 is held at a predetermined voltage level by Zener diode 177, with the emitter output of the transistor appearing across shunt capacitor 178 on line 179.

In similar manner, the negative output of full wave rectifier 170 is applied by way of line 181 across capacitor 182 to the input of voltage regulator transistor Q9. The base of Q9 is connected through Zener diode 183 to the common ground line 174. The output from Q9 is applied across capacitor 185 and is carried on line 186 to the input of transistor regulator Q10. Here again, the base of Q10 is connected through Zener diode 187 to common line 174 and the output of Q10 is applied across capacitor 188 to output line 189.

The series regulators in the positive and negative output lines from the full wave rectifier provide a very stable positive voltage on line 179 and an equally stable negative voltage on line 189, which voltages are used to supply the compensating voltage for the two sensors 25 and 26. The variable voltage for sensor 25 is obtained from a pair of potentiometers 200 and 201 connected between positive and negative lines 179 and 189. Potentiometer 200 provides a coarse adjustment of the DC voltage to be applied to the sensor, while potentiometer 201 provides a fine adjustment, both potentiometers being variable from a positive to a negative value, with their center positions representing a zero voltage. The slide wires of the two potentiometers are connected through suitable resistors to an output line 202 which is connected through a null circuit power switch 203 and line 204 to one arm 205 of selector switch 60. When switch arm 205 is closed, the output voltage from potentiometers 200 and 201 is applied to terminal D in connector 52. Referring now to FIG. 5, it will be seen that the voltage appearing at terminal D will be applied by way of line 62 through a resistor 210 to the secondary winding of the saturable core in sensor 25. This induces in the core a DC flux component which may be adjusted by variation of potentiometers 200 and 201 to a value having a magnitude and polarity which will effectively cancel the component of any undesired external field which is parallel to the axis of sensor 25. It will be noted that capacitor 154 prevents this DC voltage from reaching the primary of sensor 25.

A second pair of potentiometers 220 and 221 are connected between lines 179 and 189 to provide an output line 222 a DC voltage of selected amplitude and polarity for application to the secondary winding of sensor 26. The signal on line 222 is applied through null circuit power switch 203 and line 224 to a switch arm 225 on selector switch 60. The null circuit power switch, when closed, connects the null balancing circuit to lines 204 and 224. At the same time, switch 203 connects lamp 223 across the primary of transformer 38 to provide an indication of the status of the switch.

When switch arm 225 of selector 60 is closed, the output voltage from potentiometers 220 and 221 is applied by way of terminal C and line 63 (FIG. 5) through resistor 226 to line 156 and thence to the secondary winding of sensor 26. Again, this DC voltage is blocked from the primary of sensor 26 by means of capacitor 158. The DC signal supplied by way of terminal C produces a flux in the core of sensor 26 which is of selected polarity and amplitude to permit external field components parallel to the axis of the core to be balanced out so as not to affect its output.

By proper adjustment of the null balancing circuits, background and other undesired magnetic effects can be cancelled from the output of the two sensors, allowing them to detect with great sensitivity changes in the background field or varying magnetic fields superimposed thereon by a target solenoid or the like. Such changes will appear as alternating currents on output lines 152 and 156, which signals will pass through corresponding blocking capacitors 230 and 231 and will appear across shunt resistors 232 and 233, respectively.

Terminals D and C are connected through capacitors 235 and 236 and capacitors 237 and 238, respectively, to ground line 151. These filter capacitors serve to prevent any AC components in the DC null balancing currents, which might be generated by variable cable loading or other noise factors, from being applied to the secondary windings of the sensors. Furthermore, these capacitors shunt to ground any AC output from the secondary windings which might flow back through lines 62 and 63 to the null balancing circuit 56.

In order to maintain maximum reliability and sensitivity, the output signals from the sensors are not amplified in the remote portion of the magnetometer. Because of the extreme range of sensitivity of the present device, remote amplification would require provision for range switching. In applications where the remote and the base portions of the circuit are close together or are constructed in a single unit, this does not present any particular problem. However, where the remote portion is to be located a considerable distance from the base portion, or in an inaccessible spot, a capability for range switching complicates the system unnecessarily, and reduces reliability. Further, since the detected signals are being processed in separate channels in the remote portion, a duplication of circuitry would be required which would introduce differential errors due to differing drift and temperature characteristics. To avoid these problems, the output voltages appearing across resistors 232 and 233, representing the outputs from sensors 25 and 26, respectively, are converted to direct current for transmission by way of terminals A and B to the base portion of the system. This is accomplished by applying the voltage across resistor 232 to the full wave detector rectifiers 240 and 241, producing a varying direct current at terminal A which is representative of the field sensed by sensor 25. In similar manner, the voltage appearing across resistor 233 is detected by full wave rectifiers 242 and 243 in detector 64, producing a varying direct current at terminal B representative of the field component sensed by sensor 26.

Although the conversion of the detected signals to direct current produces numerous advantages, particularly where connector 52 is a cable having considerable length, nevertheless such conversion to direct current without preamplification presents some problems. For example, near the null condition of the magnetometer there exists a "dead" band which is below the diode threshold voltage. This dead band requires that the output signal from a sensor build up to a certain point before it will exceed the diode threshold voltage and produce substantial conduction. Several features of the circuitry already described have been included to overcome this problem. For example, the use of a ferroresonant driving condition for the primary windings of the sensors provides a strong signal output from the magnetometers. This, together with the resistive loading of the secondary windings insures that ample voltage will be available during both positive and negative pulses to exceed the diode threshold. In addition, the primary winding of each sensor intentionally may be slightly unbalanced so that one side of the secondary always receives a larger pulse than the other. This is accomplished by providing a slightly higher turns ratio on one side of the primary than on the other. This unbalance does not materially affect the time of the core saturation of the two legs of the sensor, but during the saturated interval the structure is reduced essentially to an air core differential transformer having a higher turns ratio on one side than on the other. The net effect is an output pulse proportional to the unbalance, which output can be adjusted to produce a null field output of sufficient positive and negative pulse amplitudes to exceed the diode thresholds. Alternatively, or additionally, a portion of the primary drive signal may be supplied to the secondary, as by RC network 154, 155 for core 10 and RC network 158, 159 for core 12. The amplitude of the drive signal so coupled to the secondary windings can be adjusted to produce an alternating output when the external magnetic fields have been balanced to produce a null field condition in the cores, and this output will be of sufficient amplitude to insure diode conduction. The magnetic field of interest that is sensed by the sensors then is superimposed on this portion of the primary drive signal and is detected by the diode circuits. Either of these techniques may be used to eliminate the need for AC amplification and increases the sensitivity of the magnetometer circuit.

The decoupling capacitors 152, 230 and 231 are inserted between the secondary windings and the detector circuits so that the current from the null balancing circuit 56 can be injected directly into the secondary windings of the sensors 25, 26 without affecting the direct current detector circuits 64. In this manner, the sensing windings are also used to compensate for noise or background fields, such as the earth's field or the like, without requiring an additional winding.

The signals on terminals A and B, representing the sensed magnetic field, are applied to the base portion of the magnetometer (FIG. 4), after passage through connector 52, to corresponding equalizer networks in equalizer 66. The equalizer for terminal A consists of a potentiometer 250 connected in series through a resistor 251 to ground line 252. The sliding arm output from potentiometer 250 is applied by way of line 253 to one terminal of switch arm 254 which is a part of selector switch 60. In similar manner, terminal B is connected through potentiometer 256 and through resistor 257 to ground line 252, with the sliding arm of the potentiometer being connected through line 258 to a second contact for switch arm 254.

Selector switch 60 permits determination of which of the two sensors is to be activated and applies to that unit the null balancing current from its corresponding null balancing network, while at the same time connecting the corresponding output channel from the selected unit through its equalizer network to switch arm 254. From there the signal is fed through normally closed push button contact switch 260 and line 261 to the amplifier and range selector 68.

DC amplifier 265 is of any conventional design and therefore is not shown in detail. The positive supply voltage for this amplifier is obtained from the regulated positive voltage appearing on line 176 in the null balancing circuit 56, while the negative supply for the amplifier is obtained by way of line 186 in that same circuit. The range selector is comprised of a variable RC shunt across amplifier 265 and includes a capacitor 266 and a plurality of selectable shunt resistors. A movable switch arm 267 permits selection of any desired one of the shunt resistors, each of which may be adjusted to provide the desired range of response. This range selector arrangement thus regulates the amplification of DC amplifier 265, the output of which is applied to readout meter 70 and, by way of resistor 270 and potentiometer 271 to a suitable recorder 72. Selector switch 60 thus feeds the outputs of the magnetometer core elements selectively through a common DC amplifier having selectable calibrated ranges and providing both meter and recorder outputs. The amplifier and the range selector resistors may be calibrated through the use of variable resistor 275, which may be switched into the input of amplifier 265 by depressing push button switch 260, and the amplifier may be balanced by adjustment of variable resistor 276.

The particular structural and circuit features of the magnetometer as described above with respect to FIGS. 4 and 5 produce a device which is extremely sensitive to magnetic fields. A device made in accordance with the foregoing description has functioned at a sensitivity or resolution level of 0.01 gammas. With the horizontal component of the earth's magnetic field ranging from 14,000 to 28,000 gammas within the United States, this resolution level permits measurement of magnetic fields which have changes as small as one part in 2,800,000 with respect to the earth's field. This degree of sensitivity provides a capability for use in many fields, as will be recognized by those skilled in the art. In particular, however, the magnetometer is useful in the measurement of magnetic characteristics which are weak with respect to the strong background field provided by the earth's magnetic field. Thus, it appears that the present invention will be of great value in airborne magnetometer surveying.

One of the major problems in aerial surveying involves the accurate positioning of the aircraft carrying the measuring instruments so that proper readings can be obtained. The extreme sensitivity of the present magnetometer substantially reduces this problem in that a determination of a magnetic gradient can be made with a very small distance between adjacent measurements. In prior devices, it was necessary to fly two or more parallel paths over the territory being surveyed in order to obtain readings of the magnetic field which differed sufficiently to provide a measurable gradient which could be plotted and used to indicate the presence of mineral deposits or unusual formations. The paths had to be some distance apart because of a lack of sensitivity in the magnetometer units used. As will be appreciated, maintenance of a predetermined distance between the parallel paths was extremely difficult, and thus the results were limited as to accuracy. The present magnetometer overcomes this problem because its sensitivity permits accurate measurement of a field gradient using magnetometers spaced only 8 or 10 feet apart. This makes it possible to obtain a measurable gradient in one pass over a given area by mounting a pair of magnetometer sensors on a single support which may be lowered out of an aircraft. The support allows the sensors to be far enough removed from the aircraft that degaussing of the plane is not necessary.

Photographs of the area to be surveyed may be obtained in stereoscopic pairs from the U. S. Department of Agriculture, and from these photographs contour maps may be made. A mosaic pattern may then be laid out on the map to form a grid defining the flight path of the aircraft. Orientation points are selected and during flight over the selected area photographs are taken concurrently with the magnetometer readings to provide accurate location of the reading. At the same time, the altitude of the magnetometer sensors is also recorded. The recorder and the other base portion circuitry of the magnetometers are located within the aircraft, the recorder providing a record of the magnetic readings, the locations where photographs are taken, and the height of the plane. The spaced sensors measure different magnetic patterns, and this pattern, or gradient, provides information concerning the earth's geological structure. From this information, data may be obtained concerning, for example, the location of mineral deposits, as indicated by variations in the normal value of the earth's magnetic field, and by characteristic gradient patterns that can be more accurately measured in a single pass over the territory with a fixed distance between sensors than was possible with plural passes where the distance between the magnetometer paths varied in an unpredictable manner.

Figure 6:
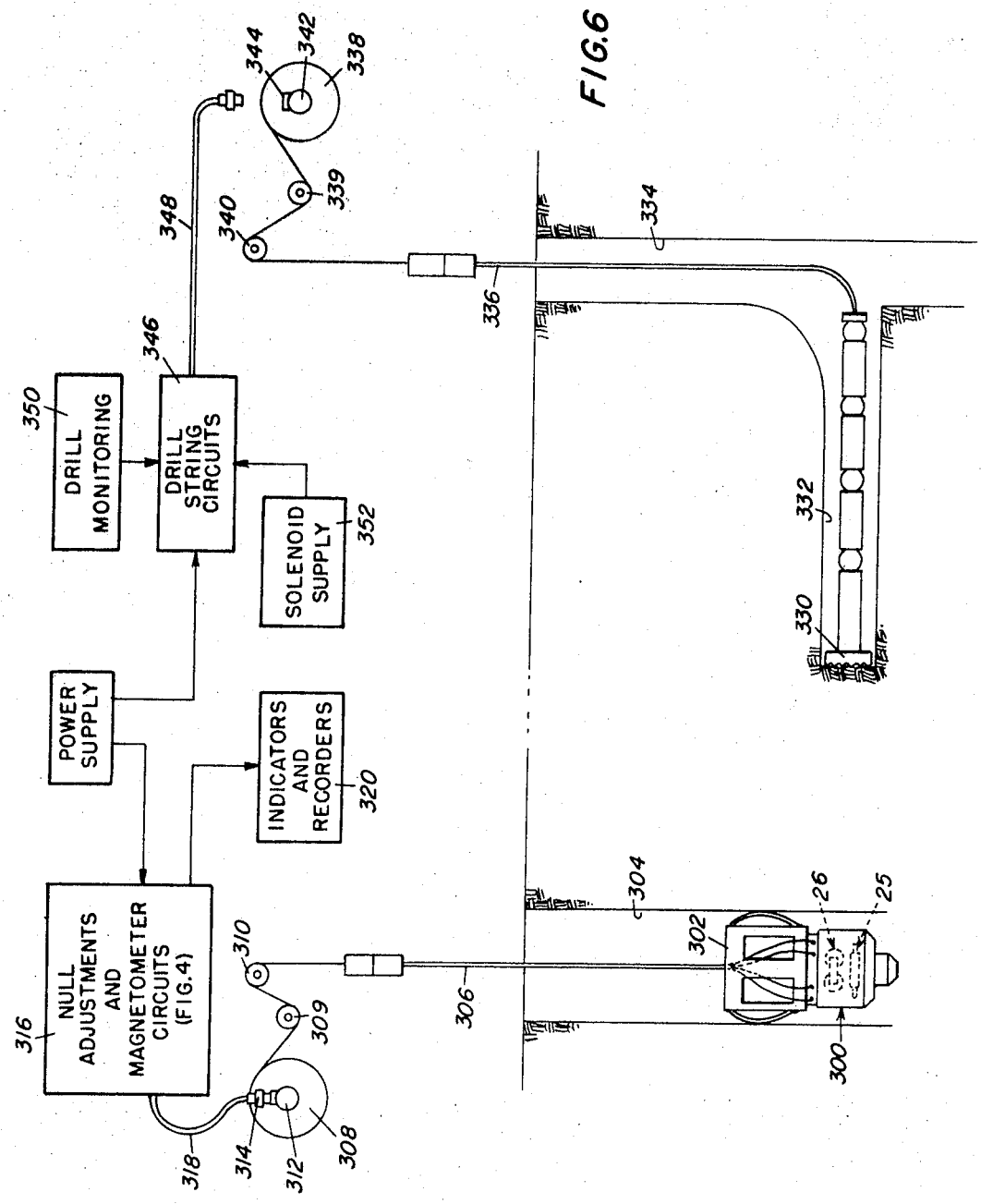
FIG. 6 is a diagrammatic illustration of a guidance system for off-vertical drilling.

The magnetometer of the present invention also finds an important use in conjunction with a system for guiding an off-vertical drill. The guidance of off-vertical drills, and more particularly the drilling of a horizontal hole between a first vertical hole and a second target hole is generally taught in the prior art. See, for example, U.S. Pat. No. 3,285,350 and U.S. Pat. No. 3,406,766 to J. K. Henderson. These patents describe a system wherein a signal-sending device is positioned in one of the holes and a signal receiving device is positioned in the other well. The sending device is mounted on the drilling mechanism, and means are provided for controlling from the surface the direction of the drill in response to indicating signals from the receiver. The magnetometer of the present invention can be adapted for use as the receiver in such guidance systems, and the sensors for such a receiver are indicated in FIG. 6 at 300. The receiver 300 corresponds to the remote portion of the present magnetometer as illustrated in FIG. 5, but is mounted in a nonmagnetic housing which may be, for example, stainless steel. The receiver is gimbal mounted and lead weighted so that it is self-leveling to insure that the sensors are in a horizontal position so that accurate measurements can be obtained. The receiver 300 includes the sensors 25 and 26, the oscillator voltage regulator, the oscillator, the buffer amplifier and drivers, the nulling circuitry and the sensors for the magnetometer, as described hereinabove. A suitable guide mechanism 302 locates the receiver in the center of bore hole 304 while a logging cable 306 of any desired length connects the receiver to the base instrumentation at the ground surface. As is well known, cable 306 may be wound on a reel 308 after passing over pulleys 309 and 310, to permit the receiver to be raised and lowered. Connection between the cable and the base circuitry is maintained by way of collector rings 312 and suitable brushes 314 on the reel 308, the brushes 314 being connected to the base portion circuitry 316 by way of cable 318. The circuitry included in base portion 316 is illustrated in FIG. 4, with cables 306 and 138, collector rings 312, and brushes 314 together being the functional equivalent of the connector 52 illustrated in FIGS. 3, 4 and 5. The indicators and recorders 320 will provide readings which permit accurate guidance of the drill 330 located in the off-vertical bore 332. In the present example, it may be considered that the bore 332 is to connect vertical well 334 with target well 304 and drill 330 is therefore to be guided toward the sensor-receiver 300. Drill 330 may be of any desired type, but conveniently may be a jet type drill having a rotatable nozzle which causes a high velocity stream of fluid to be ejected in a selected direction. The nozzle may be rotated by means of a motor within the drill string to thereby direct the jet stream in the direction in which the drill is to travel. Suitable monitoring equipment is provided in the drill string to permit a determination of the drill attitude as well as to provide control of the motor. In addition, the drill string carries an electromagnet which is energized to produce an identifiable field which can be detected by receiver 300. The sensitivity and reliability of the magnetometer described hereinabove permits detection of this identifiable field even under adverse environmental conditions, extreme variations in cable lengths and cable transmission characteristics and great distances between the well and the target hole.

The drill string monitoring and control circuitry is connected to the surface monitoring and control circuitry by way of logging cable 336 which is carried on reel 338 after passing over suitable pulleys 339 and 340. Again, slip rings 342 and brushes 344 are provided to permit connection between the up-hole drill string circuits 346 and cable 336 by way of connecting cable 348. The drill monitoring circuits 350 and the magnet, or solenoid, supply circuits 352 are connected to the drill string by way of drill string circuits 346.

Figure 7:
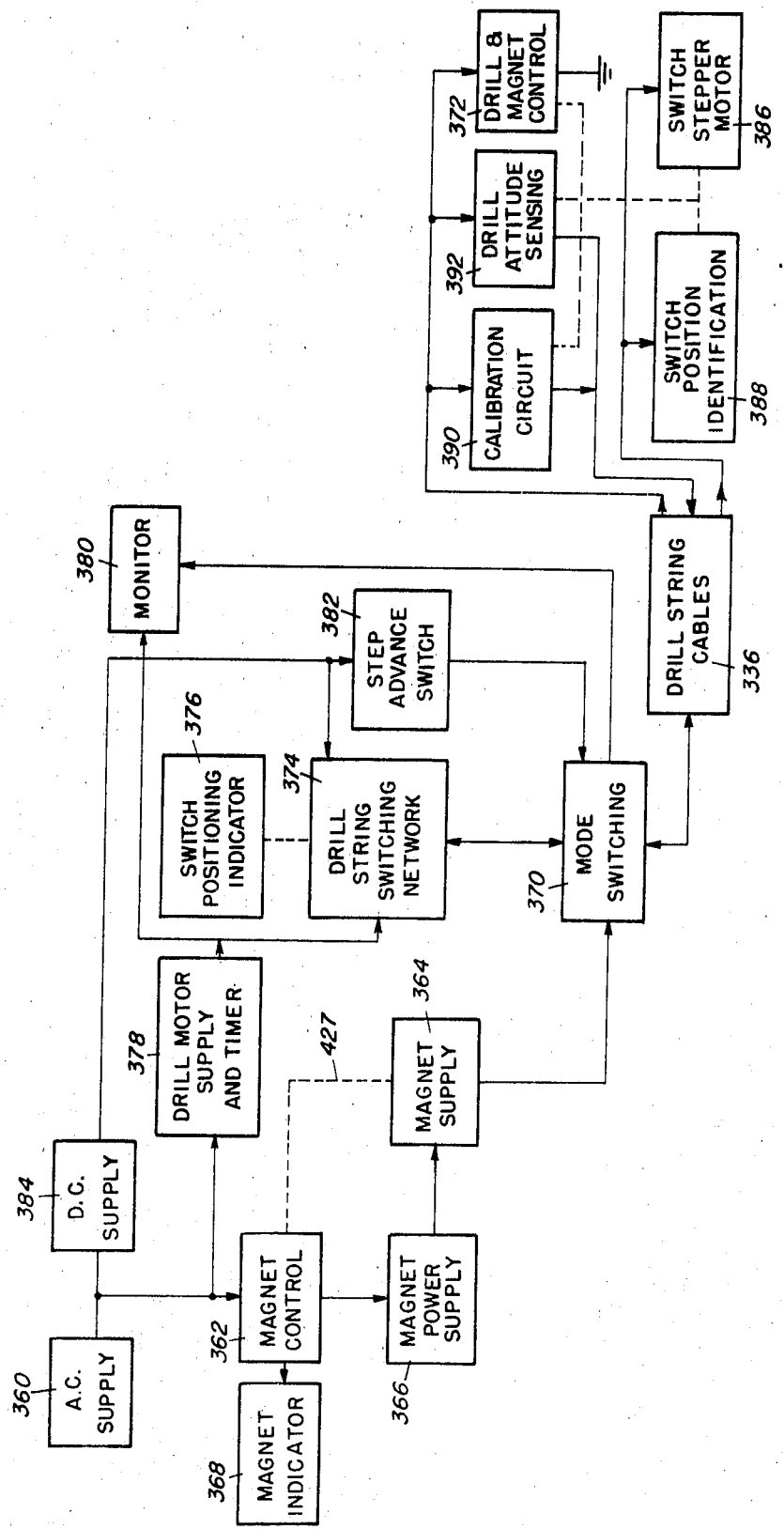
FIG. 7 is a block diagram of the circuitry used in the guidance system of FIG. 6.

FIG. 7 is a block diagram of the base, or surface, portion of the drill control system and the associated remote, or down-hole, drill string circuits. In the base portion, an AC supply 360 provides alternating current to a magnet control circuit 362 which includes a motor operable through the magnet supply circuit 364 to produce a cyclically varying voltage for application to the magnet carried by the drill string. A magnet power supply circuit 366 receives alternating current from the magnet control 362 and produces a filtered direct current to supply circuit 364. An indicator circuit 368 indicates whether the drive motor of magnet control circuit 362 is operating and provides indicator lights to disclose whether the voltage being produced is going in a positive or a negative direction. This cyclically varying signal is applied by way of the mode switching circuit 370 to the drill string cables 336 and thence to the drill and magnet control circuit 372 at the drill string.

To insure that the control signals to the drill motor and to the magnet are directed through the appropriate circuits, a drill string switching network 374 is provided at the base portion of the system. This switching network comprises a three-deck stepping switch. One deck of switch 374 comprises a position monitor which produces output signals to a switch position indicator 376. AC from source 360 is fed to the drill motor supply and timer circuit 378 which, in turn, supplies to the motor which controls the direction of the drill an alternating current for a predetermined period of time each time it is activated. The output of circuit 378 is fed to the drill string switching network 374 and through the mode switching network 370 to the drill and magnet control circuit 372. The output of network 378 is also fed to a monitor 380 to permit an operator to determine whether the motor supply circuits are operating.

A step advance switch 382 provides a direct current from DC supply 384 through the mode switching network 370 and drill string cables 336 to a switch stepper motor 386. Each pulse from the step advance switch causes the stepper motor 386 to operate a three-deck stepping switch located in the drill string. One deck of this stepping switch is used for a position identification network 388 which corresponds to the similar network in the base portion. The remaining decks of the switch provide calibration signals, permit sensing of the attitude of the drill string, and direct control signals to the drill motor and the magnet. These functions take place in the calibration circuit 390, the drill attitude sensing circuit 392 and the drill and magnet control circuit 372. The outputs from position identification network 388, and the calibration and attitude sensing networks are fed back up through the drill string cables 336 and the mode switching network 370 to the monitor 380. When network 388 is being monitored, a comparison of monitor 380 with position indicator 376 will provide an indication of whether the position of the drill string stepper switch corresponds to that of switching network 374.

Figure 8A:
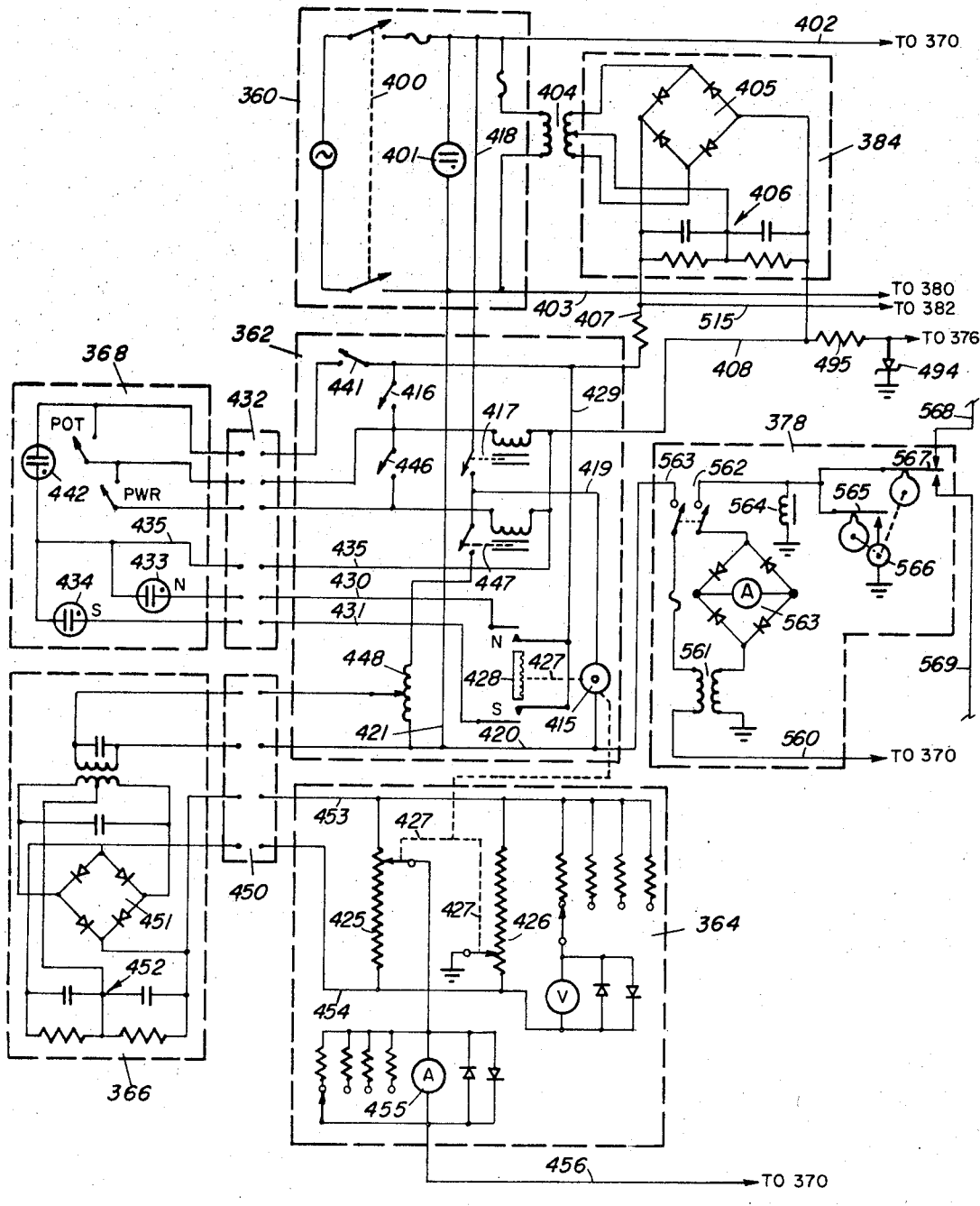
FIGS. 8A and 8B are a schematic diagram of the base portion of the circuitry of FIG. 7.
Figure 8B:
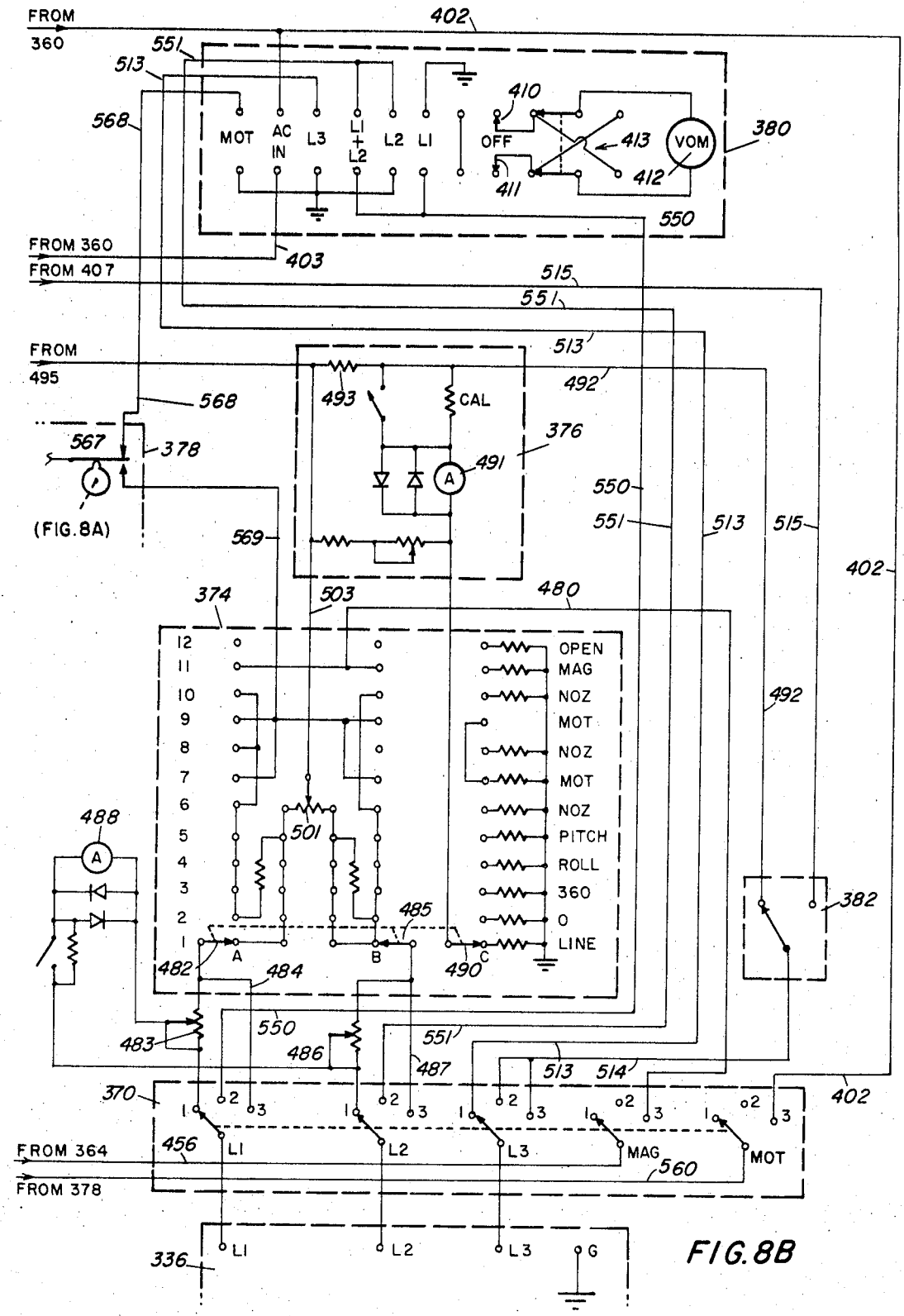
Figure 10:
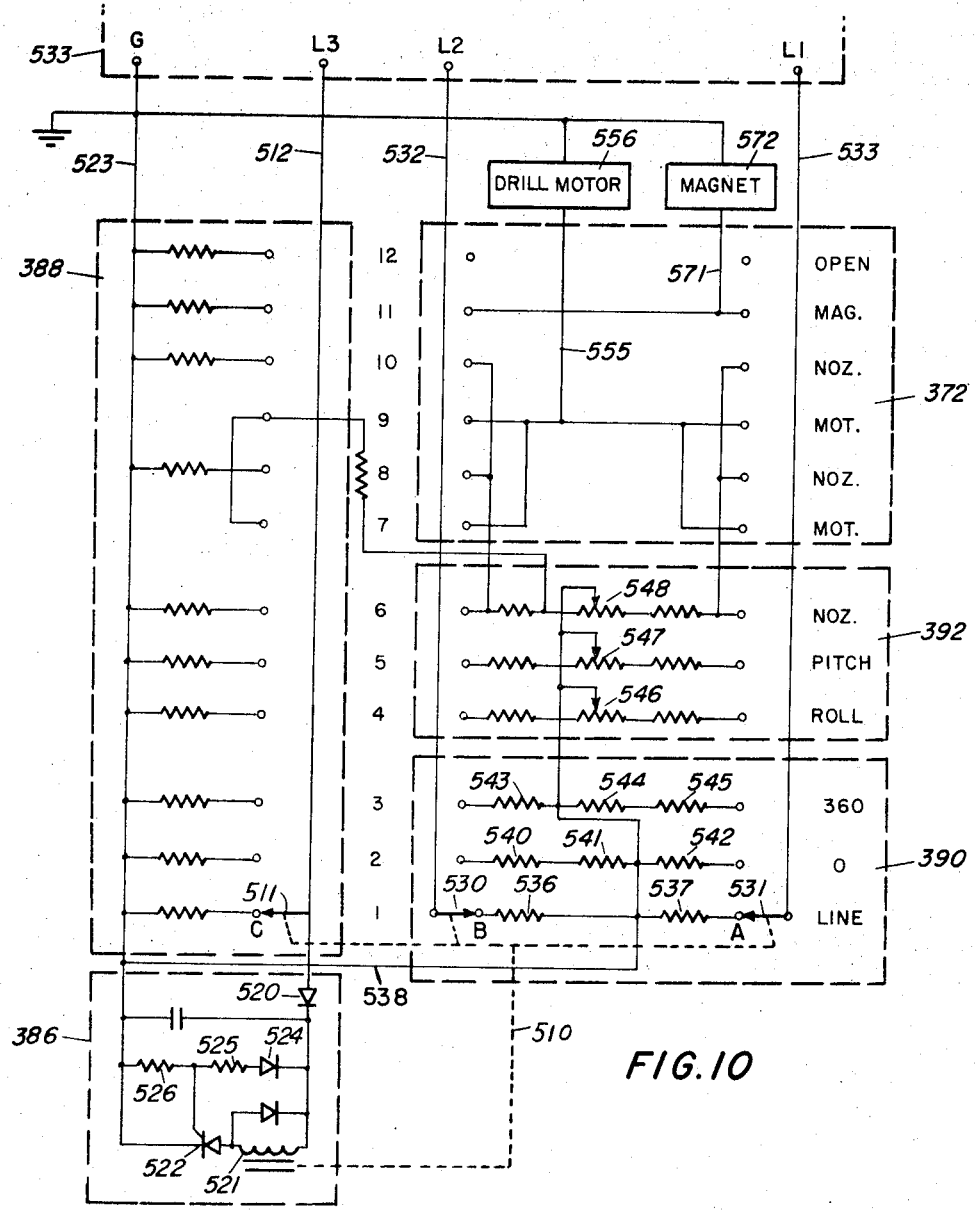
FIG. 10 is a schematic diagram of the remote portion of the circuitry of FIG. 7.

The various circuits involved in the blocks of FIG. 7 are illustrated in greater detail in FIGS. 8 and 10. As shown in FIG. 8, the AC supply 360 includes a master power switch 400 and a power on indicator 401. An alternating current output is applied across lines 402 and 403 and by way of transformer 404 to the DC supply 384. The DC supply consists of a conventional full wave rectifier 405 and filtering means 406, to provide a positive output on line 407 and a negative output on line 408. Lines 402 and 403 are connected to the "AC in" terminals of monitor 380, for measurement, if desired. The monitor includes a multicontact selector switch 410, 411, across which is connected a suitable volt-ohmmeter 412, or other suitable indicator means. A polarity reversing switch 413 may be provided for the meter.

For reasons that will be explained, a motor-driven potentiometer is used to generate the desired wave form in the current applied to the magnet. This motor is indicated at 415 in the magnet control circuit 362. To energize motor 415, an on-off switch 416 is closed, connecting solenoid switch 417 across the DC lines 407, 408. This energizes the solenoid and closes its switch contact, thereby feeding alternating current from line 402 through line 418, line 419, motor 415, line 420 and line 421 back to the other side of the alternating current source at line 403. Motor 415 may then rotate to drive its associated potentiometers 425 and 426 in the magnet supply circuit 364, by way of mechanical linkage 427. This mechanical linkage is such that the resistance value of one potentiometer increases as the other decreases, and vice versa.

Linkage 427 also serves to drive a cam element 428 in synchronization with the motion of the potentiometers, whereby at the limit of each sweep, that is, at each positive and negative maximum of the potentiometer, a switch N or a switch S is closed to provide a remote indication of the direction in which the potentiometer is moving. Switches N and S are connected across the DC lines 407, 408 by way of line 429, either switch N or switch S, line 430 or line 431, respectively, through a suitable connector 432 and thence to either N indicator lamp 433 or S indicator lamp 434, respectively. The return line 435 passes through connector 432 and is connected to DC line 408.

Remote lamps 433 and 434 are located in the magnet indicator 368 which preferably is associated with the magnetometer circuits for indication at that location of the polarity of the magnetic field being generated. To permit remote operation of potentiometer motor 415, a remote switch 440 is provided in parallel with on-off switch 416. Switch 440 is connectable across DC supply lines 407, 408 by means of a remote power switch 441 which, when closed, permits control from the remote indicator 368. When switch 441 is closed, a glow lamp 442 is connected across power supply lines 407, 408 by way of line 435 to indicate that the remote unit can control the system.

Energization of motor 415, however, is not sufficient in itself to provide a signal for the magnet; for this, a DC current must be supplied to the varying potentiometers. This is accomplished by means of a magnet "on" switch 446 in the magnet control circuit 362. When closed, switch 446 connects a solenoid switch 447 across DC supply lines 407, 408, closing its associated contacts and providing alternating current from the AC source by way of line 418, solenoid switch 417, solenoid switch 447, autotransformer 448 and return line 421. A suitable voltage is tapped from the autotransformer 448 and applied through connector block 450 to the magnet power supply 366. This power supply consists of a full wave rectifier 451 and filter 452 which provide a filtered direct current across lines 453 and 454 in the magnet supply circuit 364. Potentiometers 425 and 426 are connected across these DC lines, with the slide arm of 426 being connected to ground and the slide arm of potentiometer 425 being connected through ammeter 455 to output line 456. A variable range DC voltmeter may be connected across lines 453 and 454 to monitor the output of the magnet power supply. Similarly, the variable range ammeter 455 permits monitoring of the output current carried by line 456. By energizing motor 415, the potentiometer slide wires are driven repetitively in opposite directions, producing on line 456 a current of determinable waveform.

To produce an identifiable field and to prevent polarization of the magnet and the associated drill components, the magnet drive current on line 456 must be an alternating current. The frequency of alternation must be low in order to limit eddy current losses in the magnet as well as in the medium between the magnet and the magnetometer sensors. The magnet itself may have a core of a vanadium-permendure material, and in one embodiment was made 24 inches long with a 2½ inch diameter. The coil for the magnet in this embodiment consisted of approximately 8,000 turns of wire, epoxied as wound and then epoxy-cast to provide a waterproof structure.

Figure 9:
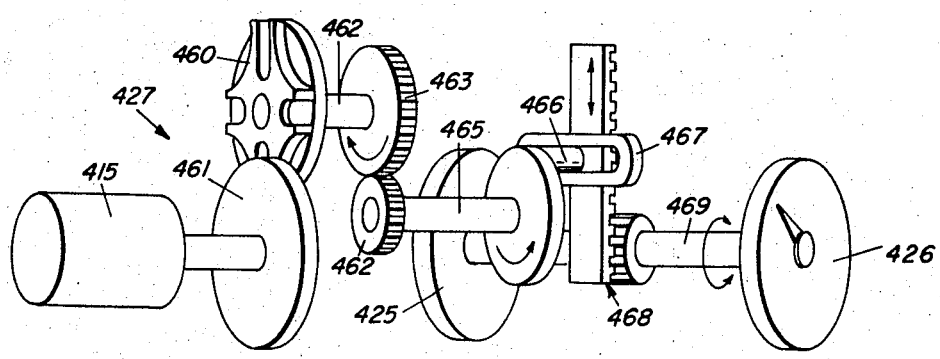
FIG. 9 is a diagrammatic illustration of a wave form generator suitable for use in the circuit of FIG. 8.

In order to provide maximum flux density in the magnet core, the drive current should be of a square wave nature. This insures that a high magnetizing field will exist sufficiently long to establish the maximum flux. The generation of such a current by usual means is not practical in this application because of the very large switching transients generated by the inductance of the magnet. These transients are of such magnitude as to render some equipment inoperable, and surge suppression does not provide the degree of reliability required. Thus, the waveform generator described above and shown in greater detail in FIG. 9 is used in the present system. As illustrated, motor 415 drives a Geneva movement 460 by means of a roller cam plate 461 connected to the shaft of motor 415. The cam plate may carry one, two or four lugs which cooperate with the Geneva gear to provide one, two or four reversals of the potentiometers 425 and 426 per revolution of the motor. The Geneva gear drives a shaft 462 on which is mounted a first gear 463 driving a second gear 464 mounted on shaft 465. The opposite end of shaft 465 carries a cam lug 466 slidably engaged with a key slot 467 on a rack and pinion gear 468. The pinion gear is mounted on shaft 469 which carries the movable arms of potentiometers 425 and 426. Thus, the rotation of motor 415 is converted to linear motion in the rack and pinion 468 and thence to a reciprocating rotary motion in the potentiometers. This latter motion is of an essentially square wave character. As has been described, the potentiometers are cross wired so that as one slider moves toward a more positive position, the other slider moves toward a more negative position. The periodic reversal of the slider directions thus provides a means for reversing the current through the magnet in a controlled manner with no switching transients. The Geneva movement provides the proper dwell time to produce the square wave output required. In the event that background noise frequency interferes with measurements at the magnetometer, the Geneva gear cams can be changed to provide different switching speeds. Further, by providing a range of chart speeds in the magnetometer recorder, a combination of switching speed and recording speed can generally be found that permits the signal to be readily identifiable in the noise. The switching speed of the potentiometers is slow enough to permit the establishment of an essentially static magnetic field during the dwell period before reversal.

It will be apparent that, if desired, the N and S switches described in the magnet control circuit 362 can be operated by the rack portion of the rack and pinion gear 468. The remote polarity indications provided by these switches provide means for determining the quadrant in which the vector of the sensed magnetic field is to be plotted in the magnetometer recorder.

The magnet drive current on line 456 is applied to the mode switching network 370. This network comprises a five-deck switch having movable arms L1, L2, L3, a magnet switch labeled "MAG," and a motor energizing switch labeled "MOT." Each switch arm has three contacts, with the arms being ganged together for connection to corresponding contacts. Line 456 is connected to the magnet switch whereby when the arm of this switch is at contact 3, line 456 is connected by way of line 480 to contact 11 of the multiposition step switch in the switching network 374.

Switching network 374 comprises a three-deck switch 481 having three movable contact arms ganged to a common shaft. Switch 481 has twelve contacts on each deck, and the contacts are interconnected in a manner to permit both measurement of drill string conditions and the sending of control signals thereto. Movable contact 482 in deck A of switch 481 is connected through a variable resistor 483 to contact 1 of switch L1 and is connected through line 484 to contact 3 of switch L1. Similarly, contact switch arm 485 is connected through variable resistor 486 to contact 1 of switch L2 and through line 487 to contact 3 of switch L2. A meter 488 is connected across the first contacts of switches L1 and L2 to permit continuous monitoring of the signals appearing on L1 and L2 when they are shifted to these contacts.

Switch arm 490 on deck C of switch 481 is connected through the switch position indicator 376, which includes ammeter 491, to negative DC line 492. This line is connected through resistor 493, across Zener diode 494 and through resistor 495 to negative DC supply line 408. Each of contacts 1-12 on deck C is connected through a predetermined resistance to ground whereby the location of switch arm 490 can be determined by the current flowing through ammeter 491. Thus, position indicator 374 provides a means for determining the location of the switch arms which make up switch 481.

On deck A of switch 481, contacts 2-6, 8 and 10 are connected by way of resistor 500 to contact No. 1 on deck A and to one end of potentiometer 501. Similarly, contacts 2-6, 8 and 10 on deck B are connected through resistor 502 to the other end of resistor 501 and to contact 1 of deck B. The sliding contact on potentiometer 501 is connected by way of line 503 to the junction between resistors 493 and 495, and thus to the regulated DC voltage appearing across Zener diode 494. When switch 481 is in any of positions 1-6, 8 or 10, and mode switches L1 and L2 are in either position 1 or 3, a DC current is fed through contacts L1 and L2 to the drill string circuitry. These positions of the switch 481 are the calibrating and attitude measuring positions and correspond to the circuits 390 and 392 in the drill string. Since the attitude measurements are taken across resistors which vary in accordance with the drill position, the current flow through switch arms L1 and L2 will be indicative of these values, and this current flow is measured by meter 490 whe L1 and L2 are at their respective number 1 contacts.

Contacts 1, 2 and 3 of switch 481 permit calibration of the indicator and monitoring circuitry, by feeding a measurable current to calibration circuit 390 to provide a measurement of the line voltage, a voltage representing a zero angular position of the drill and a voltage representing a 360° angular position, respectively. Positions 4, 5 and 6 of switch 481 provide a current to the attitude sensing network 392, whereby voltages proportional to the angle of roll in the drill string, the pitch angle, and the position of the jet nozzle, respectively, can be obtained. Positions 8 and 10 are interconnected with contact 6 to provide further sensing of the nozzle position. Contacts 7 and 9 are interconnected and permit energization of the motor which adjusts the position of the jet nozzle by providing a current to the drill control network 372; thus, as switch 481 moves through contacts 6-10, the nozzle position is sensed, the motor is energized for a period of time, the nozzle is again sensed, the motor energized again and, finally, the position of the nozzle sensed again. This allows a fine adjustment of nozzle position without having to provide a reversible switching network or without having to go through the entire switching network each time a small adjustment is to be made in nozzle position. Contact 11 for switch 481 provides energization of the magnet, by feeding the current from line 480 through switch arms 482 and 485 and mode switches L1 and L2 to the magnet control circuit 372. Contact 12 in network 374 is an open contact.

Switch 481 is coordinated with a corresponding switch 510 in the drill string circuitry (FIG. 10). Switch 510 is a multiposition stepping switch having three decks A, B and C which correspond to the decks of switch 481. Thus, deck C includes 12 contacts which are connected to resistors corresponding to those of contacts 1-12 in switch 481 to provide an indication of the location of the switch arms on switch 510. Contact arm 511 on deck C is connected by way of line 512 to arm L3 in the mode switch 370 (FIG. 8). When the mode switch arms are positioned at contact 1, line 512 is connected by way of line 513 to contact L3 of volt-ohmmeter (VOM) 412 in monitor 380. Meter 412 is thus able to measure the resistance at deck C and provide an indication of the position of switch 510. When switch arm L3 is positioned at either of contacts 2 or 3, it is connected by way of line 514 to the movable arm of step advance switch 382, which in turn may be connected to either the negative supply line 492 or to the positive supply line 515 which is connected to DC supply line 407. Thus, when mode switch 370 is positioned at contacts 2 or 3, a positive or a negative voltage will be applied to line 512, depending on the position of switch 382. This voltage will be applied across switch arm 511 and through diode 520 to the switch stepper motor 385, which may then be pulsed by operation of step advance switch 382 to advance the drill circuit stepper switch 510.

The stepper motor is a solenoid 521 which is connected in series with silicon controlled rectifier 522 between supply line 512 and ground line 523. A control circuit for the SCR is also connected across lines 512 and 523 and comprises a Zener diode 524 and series resistors 525 and 526. The control electrode of the SCR is connected to the junction of resistors 525 and 526. Application of a positive voltage of predetermined value on line 512 (by connecting advance switch 382 to line 515) causes Zener diode 524 to break down and permits current to flow to the control electrode of SCR 522, causing the SCR to conduct an energizing stepper motor 521. This advances stepper switch 510 from one contact to the next. The SCR remains conductive until a negative voltage is applied on line 512 (by connecting the step advance switch 382 to line 492), at which time motor 521 is de-energized and is ready for the next stepping action.

Contacts 1–12 of the step motor 510 perform the same functions as their corresponding contacts in the switching network 372. Contacts 1, 2 and 3 comprise the calibration circuit 390 and provide measurements of the line voltage and the zero and 360° angular measurements. Contact arm 530 in deck B is connected to mode switch arm L2, while contact arm 531 is connected to mode switch arm L1 through lines 532 and 533, respectively. Connected between contact 1 of decks A and B are resistors 536 and 537, the junction of which is connected by way of line 538 to ground line 523. Resistors 536 and 537 are equal, and thus can provide a balanced flow of current through lines 532 and 533 to ground. This equal flow may be obtained by adjusting the location of the movable arm of potentiometer 501 in the switching network 372 to compensate for differences in resistor values, and changes in the values due to environmental conditions. A balanced flow will appear as a null output on meter 488, when it is connected across switch arms L1 and L2. Resistors 483 and 486 permit further adjustment of the current flow to provide a balanced condition. This balanced condition is obtained when step switch 481 and mode switch 370 are both positioned at their respective contacts number 1.

Three resistors 540, 541 and 542 are connected in series between the second contacts on decks A and B of switch 510. Resistors 540 and 542 are of equal value, for example, 200 ohms, while resistor 541 may be 2,000 ohms. Ground line 538 is connected to the junction of resistors 541 and 542 to provide maximum unbalance on the B deck side, thereby simulating a zero degree drill attitude or nozzle position. Similarly, resistors 543, 544 and 545 are connected between contacts 3, with ground line 538 being connected to the junction between resistors 543 and 544 to provide the maximum unbalance on the A deck, thereby simulating a 360° drill attitude or nozzle position. The resistor values of these three resistors are the same as the corresponding three resistors across contacts 2; similarly, the resistors connected between contacts 4, contacts 5 and contacts 6 correspond to these same values. The central resistor in each series across contacts 4, 5 and 6 comprises a variable potentiometer, the movable arm of which is connected to ground through line 538. These movable arms are connected by means (not shown) which serve to vary the values of these resistors as the attitude of the drill and the direction of the nozzle change. Potentiometer 546, connected between contacts 4 on decks A and B, thus provides a measurement of the degree of roll of the drill string; potentiometer 547, connected across contacts 5 of decks A and B, provides a measurement of the degree of pitch; and potentiometer 548, connected across contacts 6 of decks A and B, measures the degree of rotation of the nozzle. Thus, when switches 481 and 510 are in positions 4, 5 or 6, that is, are energizing the drill attitude sensing portion 392, and switches L1 and L2 are positioned at contacts 1, the current through lines 532 and 533 may be measured by meter 488. It will be noted that when the slide arm potentiometer 546, 547 or 548 is centrally located, the current on lines 532 and 533 will be equal and balanced; motion of the slide arm on the contacts being measured will produce an unbalance having a corresponding magnitude and polarity which can be measured.

An alternative method of measuring the values of resistors 546, 547 and 548 may be obtained by switching mode switch arms L1 and L2 to their second contacts, whereby switch arm L1 is connected through line 550 to the L1 and the L1 + L2 contacts of monitor 380 and arm L2 is connected by way of line 551 to the L2 and the L1 + L2 contacts of monitor 380. This connection permits the use of meter 412 to measure the resistance values between line 532 and ground and line 533 and ground, and provide an indication of the location of the slide arms on potentiometers 546, 547 or 548. Contacts 8 and 10 of switch 510 are connected to the nozzle attitude sensing contacts 6, and thus serve the same purpose as contacts 6.

Contacts 7 and 9 of both stepping switch 510 and step switch 481 are the motor energization connections, the switch 510 contacts being located in the drill and magnet control section 370 of the drill string package. When contact arms 530 and 531 of decks B and A on switch 510 are connected to contacts 7 or 9, lines 532 and 533, respectively, are then connected by way of line 555 to the drill motor 556 which operates the directional nozzle. The other side of motor 556 is connected to ground line 523. Energization of the motor is accomplished by shifting the mode switch 370 to contacts 3, thus closing the motor energization circuit. This circuit may be traced from AC line 402 (at the AC supply 360) through contact 3 of the motor switch arm MOT to line 560, through the primary of a transformer 561 in drill motor supply circuit 378, motor power switch 562 and lines 563, 420 and 421 back to the other side of the AC power source. Closure of power switch 562 energizes the primary, and thus the secondary, of transformer 561, causing a current to flow through the bridge rectifier and meter circuit 563 to energize timer clutch 564. This closes cam-driven switch 565 to energize motor 566 which, in turn, drives cam switch 567, as as well as cam switch 565. When motor 566 operates, cam switch 567 opens its contact with line 568, which leads to the motor (MOT) contact of monitor 380, and closes its contact with line 569, to feed alternating current to contacts 7 and 9 of step switch 481. This current will then pass through switch arms 482 and 485 and lines 484 and 487, respectively, to the number 3 contacts of mode switch arms L1 and L2. From there, the energization current flows through lines 532 and 533 to contacts 7 or 9 of stepper switch 510 to energize the drill motor 556. The drill steering motor 556 reamins energized until timer cam switch 567 opens its contact with line 569. Motor cam switch 565 opens the circuit to timer motor 566, but clutch 564 remains energized to prevent automatic reset of the timer until switch 562 is opened. Then the timer resets to the desired running time, and is ready for the next cycle. The stepper switches may then be advanced to contacts 8 to sense the nozzle position and, if further change is required, the motor may again be energized at contact 9 and the nozzle position sensed at contact 10.

After the nozzle position has been adjusted, step switch 481 and stepper switch 510 may be shifted to their respective contacts number 11, at which position the magnet will be energized. The energization current from the magnet is obtained from line 456, the magnet energization switch MAG in the mode switch 370, line 570, contacts 11 of step switch 481, contacts 3 of mode switch arms L1 and L2, lines 532 and 533, switch arms 530 and 531 and contacts 11 of decks A and B on stepper switch 510. These latter contacts 11 are connected by way of line 571 to magnet 572 and thence to ground, energizing the magnet with the predetermined wave form generated by the device of FIG. 9 and thus producing the desired magnetic field. This field is detected by the magnetometer sensor unit described hereinabove and illustrated in FIGS. 1–5. By cycling the stepper switches 481 and 510, and adjusting the pitch and roll of the drill string as well as the direction of the jet nozzle, and periodically energizing the magnet, the drill string can be directed toward the magnetometer, which acts as a target. By continuously monitoring the magnetometer output, it can be determined from the amplitude of the sensed field whether the drill is approaching the target or diverging therefrom and thus whether further adjustments are needed. Because of the high sensitivity of the magnetometer, a very small divergence from the desired path can be detected and quickly corrected, thereby effecting a considerable savings in time during the drilling of off-vertical holes. Such quick correction prevents the drill from straying too far from the desired path, resulting in a straighter bore and a saving in time and expense.

Thus, there has been described an improved and highly sensitive magnetometer having a variety of uses. The magnetometer is considerably more sensitive than prior devices and thus permitS great savings of time and effort in such activities as aerial surveying and off-vertical drilling. There has also been described a particular drill control circuit which is designed to cooperate with the highly sensitive magnetometer, thereby further improving the off-vertical well drilling operations. Although the invention has been set forth in terms of specific embodiments, it will be apparent to those skilled in the art that numerous changes can be made in the described circuitry without departing from the true spirit and scope of the invention as defined in the following claims.

I claim:

1. A method of guidance wherein a highly sensitive magnetometer utilizing first and second sensor elements permits detection of a magnetic target field of the order of 0.01 gammas, comprising the steps of locating an electromagnet at a target position, locating said megnetometer at a device to be guided in movement with respect to said target, driving the primary winding of said sensor elements in ferroresonance; feeding to the secondary winding of each sensor element a direct current selectively variable as to polarity and magnitude to establish in each sensor element a null condition; feeding to each secondary winding an alternating current component to produce a predetermined threshold output signal at said null condition, generating and applying to the winding of said electromagnet a current having an identifiable repetitive waveform capable of driving said electro-magnet into transient-free saturation, thereby generating a magnetic target field varying in a predetermined identifiable manner, measuring at said magnetometer the direction and strength of the magnetic field caused at said magnetometer by said target electromagnet, and guiding in accordance with said measurement said device to be guided.

2. A guidance system comprising:
 a target, said target comprising a highly sensitive magnetometer having first and second sensor elements driven in resonance by a regulated alternating current, null balance means for establishing in said first and second sensor elements a null condition, first and second diode detector means for converting the outputs of said first and second sensor elements, respectively, to direct currents representative of the strength of a sensed magnetic field, and unbalancing means for introducing a portion of said regulated alternating current into the said outputs of said first and second sensor elements for overcoming the thresholds of said first and second detector means;
 a device to be guided in motion with respect to said target, said device to be guided carrying an electromagnet for producing an identifiable magnetic field which may be sensed by said target magnetometer, said device further including means for sensing the attitude of said device and electric motor means operable to vary said attitude;
 means for directing said device in response to measurements derived from said target of the distance and direction of said device, said means for directing said device comprising means for generating and applying to said electromagnet a waveform of predetermined shape, whereby said identifiable magnetic field is generated, means for measuring the attitude of said device, and means for energizing said electric motor means; and stepping switch means in said device to be guided and in said means for directing said device for providing selective measurement of said attitude, energization of said motor to vary said attitude and application of said waveform to said electromagnet.

3. The guidance system of claim 2, wherein said means for generating a waveform comprises a source of direct current voltage and a pair of motor-driven potentiometers connected across said source, variation of said potentiometers by said motor serving to produce a waveform which does not produce transients in said electromagnet.

4. The guidance system of claim 2, further including mode switch means having monitoring and control positions and cooperating with said stepping switch means for selectively connecting control signals to said device to be guided and for connecting said device to said means for directing, whereby said device may be operated, or the attitude of said device monitored, respectively.

5. The guidance system of claim 2, wherein said device to be guided comprises a drill located in a first well and adapted to drill an off-vertical bore and said target comprises a magnetometer located in a second well remote from said first well.

6. The guidance system of claim 5, wherein said magnetometer sensor elements, a source of regulated alternating current, detector means, and unbalancing means are locatable downhole in said second well, said null balance means including a polarity and amplitude variable direct current supply located uphole out of said second well, said magnetometer further including amplifier and indicator means and selector switch means located uphole, said selector switch serving to activate one or the other of said sensor elements and to connect the output of the corresponding detector to said amplifier and indicator means, whereby the magnetic field sensed by each sensor element can be individually measured and indicated, thereby to provide increased sensitivity and accuracy to the measurement.

7. The guidance system of claim 2, further including stepper advance means for advancing said stepping switch means in said device to be guided, and position identification means connected to monitor means for indicating the position of said last named stepping switch means.

8. The guidance system of claim 7, further including position indicator means for said stepping switch means in said device to be guided.

* * * * *